United States Patent
Matheson et al.

(10) Patent No.: US 7,343,314 B2
(45) Date of Patent: Mar. 11, 2008

(54) SYSTEM AND METHOD FOR SCHEDULING AND TRAIN CONTROL

(75) Inventors: William L. Matheson, Palm Bay, FL (US); Paul M. Julich, Indialantic, FL (US); Michael S. Crone, W. Melbourne, FL (US); Douglas A. Thomae, Melbourne, FL (US); Thu V. Vu, W. Melbourne, FL (US); M. Scott Wills, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 10/438,912

(22) Filed: May 16, 2003

(65) Prior Publication Data
US 2004/0093245 A1  May 13, 2004

Related U.S. Application Data

(60) Continuation-in-part of application No. 09/129,863, filed on Aug. 6, 1998, now Pat. No. 7,092,894, which is a division of application No. 08/787,168, filed on Jan. 23, 1997, now Pat. No. 5,794,172, which is a division of application No. 08/299,271, filed on Sep. 1, 1994, now Pat. No. 5,623,413.

(51) Int. Cl.
*G06Q 99/00* (2006.01)
(52) U.S. Cl. ............... 705/8; 705/7; 706/16; 706/23; 706/41; 706/45; 706/61; 706/932
(58) Field of Classification Search ............. 705/8
See application file for complete search history.

(56) References Cited

U.S. PATENT DOCUMENTS

| | | | |
|---|---|---|---|
| 3,575,594 A | 4/1971 | Elcan | |
| 3,734,433 A | 5/1973 | Metzner | |
| 3,794,834 A | 2/1974 | Auer, Jr. et al. | |
| 3,839,964 A | 10/1974 | Gayot | |
| 3,895,584 A | 7/1975 | Paddison | |
| 4,099,707 A | 7/1978 | Anderson | |
| 4,122,523 A | 10/1978 | Morse et al. | |
| 4,361,300 A | 11/1982 | Rush | |
| 4,410,154 A * | 10/1983 | Matty ................. | 246/182 B |

(Continued)

FOREIGN PATENT DOCUMENTS

CA    2057039    12/1990

(Continued)

OTHER PUBLICATIONS

Crone, et al., "Distributed Intelligent Network Management for the SDI Ground Network," IEEE, 1991, pp. 722-726, MILCOM '91.

(Continued)

*Primary Examiner*—Andre Boyce
(74) *Attorney, Agent, or Firm*—Duane Morris LLP

(57) ABSTRACT

A scheduling system and method for moving plural objects through a multipath system described as a freight railway scheduling system. The scheduling system utilizes a cost reactive resource scheduler to minimize resource exception while at the same time minimizing the global costs associated with the solution. The achievable movement plan can be used to assist in the control of, or to automatically control, the movement of trains through the system.

26 Claims, 13 Drawing Sheets

U.S. PATENT DOCUMENTS

| | | | |
|---|---|---|---|
| 4,669,047 A | | 5/1987 | Chucta |
| 4,791,871 A | | 12/1988 | Mowll |
| 4,843,575 A | | 6/1989 | Crane |
| 4,883,245 A | | 11/1989 | Erickson, Jr. |
| 4,896,580 A | * | 1/1990 | Rudnicki ................ 89/1.815 |
| 4,926,343 A | | 5/1990 | Tsuruta et al. |
| 4,937,743 A | | 6/1990 | Rassman et al. |
| 5,038,290 A | | 8/1991 | Minami |
| 5,063,506 A | | 11/1991 | Brockwell et al. |
| 5,177,684 A | | 1/1993 | Harker et al. |
| 5,222,192 A | | 6/1993 | Shaefer |
| 5,229,948 A | | 7/1993 | Wei et al. |
| 5,237,497 A | | 8/1993 | Sitarski |
| 5,265,006 A | | 11/1993 | Asthana et al. |
| 5,289,563 A | | 2/1994 | Nomoto et al. |
| 5,311,438 A | | 5/1994 | Sellers et al. |
| 5,331,545 A | | 7/1994 | Yajima et al. |
| 5,335,180 A | | 8/1994 | Takahashi et al. |
| 5,365,516 A | | 11/1994 | Jandrell |
| 5,390,880 A | | 2/1995 | Fukawa et al. |
| 5,420,883 A | | 5/1995 | Swensen et al. |
| 5,437,422 A | | 8/1995 | Newman |
| 5,463,552 A | | 10/1995 | Wilson et al. |
| 5,467,268 A | | 11/1995 | Sisley et al. |
| 5,487,516 A | | 1/1996 | Murata et al. |
| 5,541,848 A | | 7/1996 | McCormack et al. |
| 5,623,413 A | | 4/1997 | Matheson et al. |
| 5,745,735 A | | 4/1998 | Cohn et al. |
| 5,825,660 A | | 10/1998 | Cagan et al. |
| 5,850,617 A | | 12/1998 | Libby |
| 6,115,700 A | | 9/2000 | Ferkinhoff et al. |
| 6,125,311 A | | 9/2000 | Lo |
| 6,144,901 A | | 11/2000 | Nickles et al. |
| 6,405,186 B1 | | 6/2002 | Fabre et al. |
| 6,578,005 B1 | * | 6/2003 | Lesaint et al. ................ 705/8 |

FOREIGN PATENT DOCUMENTS

| | | |
|---|---|---|
| CA | 2066739 | 2/1992 |
| CA | 2046984 | 6/1992 |
| CA | 2112302 | 6/1994 |
| CA | 2158355 | 10/1994 |
| DE | 1605862 | 5/1971 |
| EP | 0108363 | 5/1984 |
| EP | 0193207 | 9/1986 |
| EP | 0341826 | 11/1989 |
| EP | 0554983 | 8/1993 |
| FR | 2692542 | 12/1993 |
| GB | 1321053 | 6/1973 |
| GB | 1321054 | 6/1973 |
| JP | 3213459 | 9/1991 |
| WO | WO 90/03622 | 8/1993 |
| WO | WO 93/15946 | 8/1995 |

OTHER PUBLICATIONS

Ghedira, "Distributed Simulated Re-Annealing for Dynamic Constraint Satisfaction Problems," IEEE 1994, pp. 601-607.

Hasegawa, Y. "Innovative Train Control System by Radio," QR of RTRI, vol. 30, No. 4, Nov. 1989, pp. 181-189.

Hasselfield, et al., "An Automated Method for Least Cost Distribution Planning," IEEE Transactions on Power Delivery, vol. 5, No. 2, Apr. 1990, 1188-1194.

Hasselfield, et al., "An Automated Method for Least Cost Distribution Planning," WESCANEX '91: Computers, Power, & Communication Systems, pp. 179-185.

Herault, et al., "Figure-Ground Discrimination: A Combinatorial Optimization Approach," IEEE Transactions on Pattern Analysis & Machine Intelligence, vol. 15, No. 9, Sep. 1993, 899-914.

Igarashi, "An Estimation of Parameters in an Energy Fen Used in a Simulated Annealing Method," IEEE, 1992, pp. IV-180-IV-485.

Komaya, "A New Simulation Method and its Application to Knowledge-based Systems for Railway Scheduling," May 1991, pp. 59-66.

Oshima, et al., "Novel Train Control System Applicable to Railway Lines with Heavy Traffic," Japanese Railway Engineering, No. 110, Jun. 1989, pp. 1-4.

Puget, "Object Oriented Constraint Programming for Transportation Problems," IEEE 1993, pp. 1-13.

Sasaki, et al., "Development for a New Electronic Blocking System," QR of RTRI, vol. 30, No. 4, Nov. 1989, pp. 198-201.

Scherer, et al., "Combinatorial Optimization for Spacecraft Scheduling," 1992 IEEE International Conference on Tolls with AI, Nov. 1992, pp. 120-126.

Watanabe, et al., "Moving Block System with Continuous Train Detection Utilizing Train Shunting Impedance of Track Circuit," QR of RTRI, vol. 30, No. 4, Nov. 1989, pp. 190-197.

* cited by examiner

US 7,343,314 B2

SYSTEM AND METHOD FOR SCHEDULING AND TRAIN CONTROL

This application is a divisional of and claims benefit of application Ser. No. 09/476,615 filed Dec. 31, 1999, now U.S. Pat. No. 7,092,894 which is a Continuation-in-Part of and claims benefit of application Ser. No. 09/129,863 filed Aug. 6, 1998, now U.S. Pat. No. 6,154,735, which is a divisional of and claims benefit of application Ser. No. 08/787,168 filed Jan. 23, 1997, now U.S. Pat. No. 5,794,172, which is a divisional of and claims benefit from application Ser. No. 08/299,271 filed Sep. 1, 1994, now U.S. Pat. No. 5,623,413. This application is co-pending with concurrently filed applications titled "RESOURCE SCHEDULE FOR SCHEDULING RAILWAY TRAIN RESOURCES" Ser. No. 10/438,900, "AUTOMATIC TRAIN CONTROL SYSTEM AND METHOD" Ser. No. 10/438,901 and "SCHEDULING SYSTEM AND METHOD" Ser. No. 10/438,822 filed May 16, 2003, and "SYSTEM AND METHOD FOR SCHEDULING AND TRAIN CONTROL" Ser. No. 10/920,330 filed Aug. 18, 2004, the entirety of which are incorporated herein by reference.

BACKGROUND OF THE INVENTION

The present invention relates to the scheduling of movement of plural units through a complex movement defining system, and in the embodiment disclosed, to the scheduling of the movement of freight trains over a railroad system.

Today's freight railroads consist of three primary components (1) a rail infrastructure, including track, switches, a communications system and a control system; (2) rolling stock, including locomotives and cars; and, (3) personnel (or crew) that operate and maintain the railway. Generally, each of these components are employed by the use of a high level schedule which assigns people, locomotives, and cars to the various sections of track and allows them to move over that track in a manner that avoids collisions and permits the railway system to deliver goods to various destinations. A basic limitation of the present system is the lack of actual control over the movement of the trains.

Generally, the trains in presently operating systems are indirectly controlled in a gross sense using the services of a dispatcher who sets signals at periodic intervals on the track, but the actual control of the train is left to the engineer operating the train.

Because compliance with the schedule is, in large part, the prerogative of the engineers, it is difficult to maintain a very precise schedule. As one result, it is presently estimated that the average utilization of locomotives in the United States is less than 50%. If a better utilization of these capital assets can be attained, the overall cost effectiveness of the rail system will accordingly increases.

Another reason that the train schedules have not heretofore been very precise is that it has been difficult to account for all the factors that affect the movement of the train when attempting to set up a schedule. These difficulties include the complexities of including in the schedule the determination the effects of physical limits of power and mass, the speed limits, the limits due to the signaling system, and the limits due to safe train handling practices (which include those practices associated with applying power and breaking in such a manner as to avoid instability of the train structure and hence derailments).

There are two significant advantages that would be associated with having precise scheduling: (1) precise scheduling would allow a better utilization of the resources and associated increase in total throughput (the trains being optimally spaced and optimally merged together to form an almost continuous flow of traffic), and, (2) to predict within very small limits the arrival times of trains at their destination.

This arrival time in the railroad industry is often referred to as "service reliability" and has, itself, a two fold impact: (1) it provides the customer with assurance as to precisely when his cargo is going to reach its destination; and (2) for intermediate points along the movement of the trains it allows the planning of those terminus resources to be much more efficient.

For example, if the terminus of a given run is an interchange yard, and the yardmaster has prior knowledge of the order and timing of the arrivals of a train, he can set up the yard to accept those trains and make sure that the appropriate sidings are available to hold those trains and those sections of cars (or blocks of cars) in an favorable manner. In contrast, unscheduled or loosely scheduled systems result in trains arriving at an interchange yard in somewhat random order, which prevents the yardmaster from setting up the actual sidings, runs and equipment which will be required to optimally switch the cars to be picked up for the next run beyond that interchange yard.

Similarly, if the terminus is a port where there is unloading equipment involved, and removing the cargo from the train and transferring it to ships requires a set of resources that must be planned for the cargo, the knowledge of the arrival time and the order and sequence of arrival becomes extremely important in achieving an efficient use of terminal equipment and facilities.

For a complete understanding of the present invention, it is helpful to understand some of the factors which inhibit the efficiency of prior art transportation systems, particularly railway systems. Presently, trains operate between many terminal points generally carrying the goods of others from one terminal to another. Trains may also be hauling empty cars back to a terminal for reloading and may be carrying equipment or personnel to perform maintenance along the railway. Often, freight railways share the track with passenger railways.

Freight service in present railways often has regularly scheduled trains operating between various terminals. However, the make up of the trains varies widely from one trip to another. Further, the length, mass, and operating characteristics of the freight trains will vary substantially as customers' requirements for carriage among the various terminals and the equipment utilized often vary substantially. Freight trains may also be operated on an ad hoc basis to satisfy the varying requirements of the train's customers for carriage. Accordingly, from day to day, there are a substantial changes in the schedule and make up of freight trains operating on a particular railway system.

To meet the substantially varying needs for freight rail carriage, railway systems generally have a fixed number of resources. For example, any particular railway system generally has a signal network of track, a finite number of locomotives, a finite number of crews, and other similar limitations in the railway systems which can be used to meet the varying customer requirements.

The difficulties in meeting the customers' requirements of a freight railway system are often exacerbated by the fact that many railway systems have long sections of track bed on which only one main track is laid. Because the railway system generally has to operate trains in both directions along such single track sections, the railway system must attempt to avoid scheduling two trains so that they occupy the same track at the same time, and must put into place systems and procedures to identify such collision possibilities and to take some action to avoid them.

Similarly, when trains are running along a single track, a relatively fast train may approach from behind a relatively slower train travelling in the same direction. Generally, the railway system must both attempt to schedule such trains in a way that the faster train will be permitted to pass the slower train and to identify during the operation of the trains any situation in which one train is approaching a collision to the rear of another train.

Situations in which two trains meet head on or in a passing situation are often handled by the railway system by the use of relatively short track segments or "sidings" on which one or more trains may be diverted off of the main track while another train passes. After the train is safely passed on the main track, the diverted train may then be permitted to return on its journey on the main track. In the railway industry, such situations are called "meet and pass" situations. Obviously, meet and pass operations can significantly offset the ability of any train to meet a particular schedule.

With reference to FIG. 1, a general system for managing meet and pass situations may include a main track 10, a side track 20 which is selectively utilized through switches 22. The switches may be manually operated or may be remotely operated through a central control point for each segment of track known generally as a HUT 24. The HUT 24 may receive signals from track sensors 26 which indicate the presence of a train on a section of track. The train system may also include aspects 28 which are illuminated lamp systems indicating to the engineer on a given train whether or not the segments of rail immediately in front of the train and the next segment beyond are clear of traffic. Typically, in present railway systems, the operation of the aspects 28 is controlled primarily by track sensors 26 and a suitable electronic control logic in the HUT 24.

Generally, train detection sensors 26 operate along a length of track which may be as short as a half mile and may be in excess of two miles. Longitudinally adjacent sections of track are isolated into separate segments by discontinuing the track for a brief length, on the order of one quarter inch, and, optionally, placing an electrical insulator in the gap between the segments. In this way each segment of track is electrically isolated from longitudinally adjacent segments.

A voltage differential is applied between the two rails of a track and when a train is present, the metal wheels and axle of the trains serve as a conductor electrically connecting, or shorting, one of the rails of the track to the other rail, an electrical condition which can be sensed by the track sensor 26 and indicated to the HUT 24.

In present systems, the track sensors 26 between control points such as switches, are often OR'd together in the signal provided to the HUT 24. Thus, the HUT 24 is able to determine if a block of track between control points is occupied, but may not be able to determine which segment(s) within that block of track holds the train.

The HUT 24 may send information regarding various of the conditions supplied to it from the various sensors to a central dispatch facility 30 by the way of a code line 32. The present systems, as described above, provides positive separation between trains so long as the engineer obeys the light signals of the aspects 28.

One difficulty known in present railway systems such as that shown in FIG. 1 is the lack of precise information as to the location of trains along the track. In a meet and pass situation, one of the trains involved must be switched, for example, to the side track 20. This switching on to the side track 20 must be accomplished well enough in advance so that the train being switched to the side track is on the side track a sufficiently large length of time to permit a safety margin before the passage of the other train. The safety margin is necessarily related to the precision with which the location of both of the meeting, trains is known. For example, if it is known that a train travelling thirty miles an hour is located somewhere in a block of track of twenty miles in length, it may be necessary to place an oncoming train onto a siding for at least two-thirds of an hour to await the passage of the other train.

To improve this situation a prior art system, called the Advanced Train Control System (ATCS) has been designed and includes transponders, locomotive interrogators, and radio communications. In the ATCS system, transponders are placed between or near the rails of the tracks at various points along the track both between control points such as switches and outside of the control points. Interrogators inside a locomotive activate a transponder by emitting a signal which is detected by the transponder. Each transponder contains a unique identification which is transmitted back to the locomotive while the locomotive and the transponder are in close proximity. The identification information may then be sent to a computer on board the locomotive and retransmitted via a communication system 34 to the central dispatch 30. Between the passage over sequential transponders, the computer on board the locomotive can use signals from its odometer to compute the locomotive's approximate location.

Note that in such a system, the odometer error provides an uncertainty as to the train's position along the track which increases as the train moves from one transponder to another and which is essentially zeroed when the train passes over the next transponder. By placing transponders sufficiently close together, the accuracy of the position information of the train may be kept within limits. Of course, the placement of transponders along the entire railway system may substantially increase maintenance costs as the transponders are relatively sensitive electronic elements in a harsh environment. In addition, if one transponder is out, the odometer error will continue to build providing additional uncertainty as to the knowledge of the position of the train.

The results of the meet and pass system in a railway system (a) in which the train's position within the system is not exactly known and (b) in which the engineers are running largely at their own discretion can be shown diagrammatically by "stringlines" that are commonly used by present railway systems to schedule and review the efficiency of schedules which have been executed.

With reference to FIG. 2, a stringline plots time along one axis and track miles or terminals along the other axis. The grid of FIG. 2, for example, runs from 5:00 a.m. on a first day until 11:00 a.m. on the following day and depicts movement along a track interconnecting Alpha and Rome with fifteen other control points in between. Within the grid formed by the time and miles, the movements of trains are plotted. As trains move in one direction, for example from Rome toward Alpha, the stringline for a train appears as a right diagonal.

Trains starting their travel in the opposite direction, i.e. from Alpha to Rome, appear on the stringline as a left diagonal. Where one train must be sided to await the passage of another, the stringline becomes horizontal as time passes by without movement of the sided train. For example, train 11 was sided at Brovo for nearly two hours awaiting the passage of the train 99 and train B2. Similarly train 88 was sided twice, once in Bravo to wait the passage of train F6 and a second time in Echo to await the passage of train G7.

As can be seen in the stringline chart of FIG. 2, a train can spend a substantial amount of time in sidings (train 88, for example, spent almost two hours of a five hour trip sitting at sidings).

If the position of the train along the track can be determined with an increased degree of precision, the need for trains to sit in sidings for a long period of time awaiting a meeting train may be reduced substantially. Note, for example, with reference to FIG. 2, the train 88 sat in the siding at Echo in excess of one hour prior to the passage of train G7. With more precise knowledge regarding the location of the trains, train G7 may have been able to continue to run on the track until the Hotel siding at which point it could be briefly sided to await the passage of train G7. Such a reduction in time spent in sidings would equate to a reduction in overall length of time needed to take any particular trip thus permitting greater throughput for the railway system and reducing such costs as engine idling, crews, and other time dependent factors.

In the present day railway system, there is often little active control over the progress of the train as it makes its way between terminals. Often, an engineer is given an authority merely to travel to a next control point, and the engineer uses his discretion, experience, and other subjective factors to move the train to the end of his authority. Often, the overall schedule utilized with such trains does not take into account the fact that the train may be sided for a period of time, i.e., the meet and passing was not put into the overall schedule.

Without explicitly planning for meets and passes, prior art train systems generally managed meet and pass situations on an ad hoc basis, as they arose, using the skill of the dispatcher to identify a potential meet and pass situation, make a judgement as to what siding should be used to allow the trains to pass, and to set the appropriate switches and signals to effect his analysis. Because, as explained above, the dispatcher had train position data which was not particularly precise, the dispatcher may conservatively and prematurely place a train in a siding, waiting an unnecessarily long period of time for the passage of the other train.

Moreover, the dispatcher generally controls only a portion of the rail system and his decision as to which train to put into a siding and which siding to use may be correct for the single meeting being handled. However, this "correct" decision may cause severe problems as the now-delayed train meets other trains during its subsequent operation under the control of other dispatchers.

In general, the entire railway system in the prior art was underutilized because of the uncertainties in the knowledge of the position of the trains along the track and because of the considerable discretion given to train engineers who determine the rates at which their trains progressed along the tracks. No matter how well a particular system of trains is scheduled, the schedule cannot be carried out in present systems because of the variability in performance of the various trains.

Scheduling systems in the prior art generally attempted to schedule trains in accordance with the manner in which the train system was operated. Thus, with some exceptions, the schedule was determined only on a "gross" data basis and did not take into account the specific characteristics of the trains which were being scheduled nor the fine details of the peculiarities of the track over which they were being scheduled.

Because system schedulers were generally used only to provide a "ballpark" schedule by which the train dispatcher would be guided, prior art scheduling systems did not generally identify conflicting uses of track, leaving such conflicts to be resolved by the regional dispatcher during the operation of the trains.

Desirably, a schedule should involve all elements or resources that are necessary to allow the train to move, these resources ranging from the assignment of personnel, locomotives and cars, to the determination of routes, the determination of which sidings will be used for which trains, as well as the precise merging of trains such that with appropriate pacing, the main lines can be used at capacity.

In the prior art, however, a number of difficulties have been associated with these types of schedules. These difficulties fell into several categories: (1) the immense computational requirements to schedule all these resources very precisely; (2) the inability to predict the actual dynamics of the train and its motion that would be required to safely handle a train over a given piece of track; and (3) a precise schedule was practically impossible to implement because there were no commands available to the crew on the train or directly to the locomotive subsystem that would cause it to follow any precise schedule that had been established. The movement of the train in present systems is generally within the prerogative of the engineer driving the train, within of course the limitations of the signalling system in part controlled by the dispatcher and in part by the occupancy of the track by other trains.

Previous attempts at performing a system wide optimization function which precipitated a very detailed schedule. Such attempts have not been successful due in part to the prohibitively large computational requirements for performing an analysis of the many variables. In fact, when the dimensions of the problem are taken into account, the number of permutations of solutions that are possible can represent an extremely large number. Consequently, exhaustive search algorithms to locate a best solution are impractical, and statistical search algorithms have not generally been effective in problems of this scope.

OVERVIEW OF THE PRESENT INVENTION

A first step in providing a precision control system is the use of an optimizing scheduler that will schedule all aspects of the rail system, taking into account the laws of physics, the policies of the railroad, the work rules of the personnel, the actual contractual terms of the contracts to the various customers and any boundary conditions or constraints which govern the possible solution or schedule. These boundary conditions can include things such as extrinsic traffic, (which in the U.S. is most often passenger traffic) hours of operation of some of the facilities, track maintenance, work rules, etc.

The combination of all these boundary conditions together with a figure of merit, if operated on by an appropriate optimizing scheduler, will result in a schedule which maximizes some figure of merit. The figure of merit most commonly used is the overall system cost in which case the most optimum solution is the minimum cost solution.

Since the constraints of such a system are variable, (i.e. likely to change from day to day) the present invention may be structured to facilitate the use of new boundary conditions or constraints, or new contractual terms. For example, if a contract has just been signed which involves a penalty clause of a certain magnitude for late delivery, then an optimizing scheduler should take that penalty into account and allow it to be incurred only when that becomes the lesser cost option of the various scheduling options available.

Upon determining a schedule, the present invention determines a movement plan which will carry out the schedule in a realizable and efficient manner. As a next step, the present invention incorporates into the schedule the very fine grain structure necessary to actually to control the movement of the train. Such fine grain structure may include assignment of personnel by name as well as the assignment of specific locomotives by number and may include the determination of the precise time or distance over time movement of the trains across the rail network. This precise movement of the trains may include all the details of train handling, power levels, curves, grades, wind and weather conditions such that the train is able to actually follow in detail the movement plan.

Finally, the present invention provides the movement plan to the persons or apparatus which will utilize the movement plan to operate and maintain the train system. In one embodiment, the movement plan can be provided merely to the dispatching personnel as a guide to their manual dispatching of trains and controlling of track forces. In another embodiment, the movement plan may be provided to the locomotives so that it can be implemented by the engineer or automatically by switchable actuation on the locomotive.

While there is particular utility in freight railway systems, it should be noted that the system and method of the present invention have applicability beyond a railway network. The disclosed system and method may be viewed as a transportation system in which in general the variable are being solved simultaneously as opposed to being solved sequentially. It is only with such a simultaneous solution that it is possible to achieve near optimality.

Another factor that influences the overall efficiency of the rail system, particularly the capacity of the given rail system, is the minimum spacing of the trains and the relative speed of the trains. In the prior art, the concept of the moving block operation has been proposed, with a moving block consisting of a guard band or forbidden zone that includes the train and a distance in front of every train that is roughly associated with the stopping distance for that train. This concept eliminates the fixed spacing that is associated with the current fixed block signalling systems.

However, the complexity of a moving block has been difficult to realize due to the fact that the stopping distance of a train is a function of many factors, including the mass of the train, the velocity of the train, the grade, the braking characteristics of the train and the environmental conditions. One benefit of the ability to perform planning which includes detailed evaluations and analysis of the dynamics of the movement of the train, is that the stopping distance of a specific train is a natural by-product. The use of this precision train control allows the computation of the moving block guard band and permits trains to be spaced as close as their stopping distances will allow. The net results is a significant increase in the total throughput capability of a given rail corridor.

The train movement planning system disclosed herein is hierarchal in nature in which the problem is abstracted to a relatively high level for the initial optimization process, and then the resulting course solution is mapped to a less abstract lower level for further optimization. This hierarchal process means that the solution space over which the search is occurring is always diminishing as additional detail is incorporated in the search for a solution. Furthermore, statistical processing is used at all of these levels to minimize the total computational load, making the overall process computationally feasible to implement.

An expert system has been used as a manager over these processes, and the expert system is also the tool by which various boundary conditions and constraints for the solution set are established. As an example, the movement of a passenger train through the network at a predetermined time may be set as one of the boundary conditions on the solution space, and other trains are moved in the optimum manner around that constraint. As another example, the scheduling of work to be performed on a particular section of the track at a particular time may be set as a boundary condition and trains may be moved around that constraint in an optimum manner.

The use of an expert system in this capacity permits the user to supply the rules to be placed in the solution process. Consequently, every change from work rule changes to contractual changes can be incorporated by simply writing or changing a set of rules.

In some cases it can be desirable to allow the optimization process to schedule activities which normally are precluded by fixed constraints. For example, the railway maintenance activity could be considered a prescheduled constraint around which the train schedule should be moved. On the other hand, the constraint that is put into the rule base may be that so many hours of maintenance activity on a given section of track must be performed and that the cost per hour of that operation is more at night than in the day. Under those conditions, the scheduler may be allowed to schedule that activity in concert with scheduling the movement of the trains such that the overall cost of operation is minimized.

A very important aspect with the use of precision scheduling is the ability to handle exceptions when they occur. The most common problem with fixed schedules that are set up far in advance is that anomalies occur which cause elements of the network to get off schedule, and those off-scheduled elements will ripple through the system causing other elements to get off-schedule. For example, the late arrival of a train on one trip may cause a locomotive to be unavailable for a planned second trip, and the lateness of the second trip will cause again the locomotive to not be available for a third trip. Thus ripple effects are common.

A key element of the globally scheduled system with fine grain control as provided by the present invention is that it has continuous monitoring of anomalies as they occur, and allows rescheduling to compensate for the presence of these anomalies. This exception handling capability begins with the anomaly being reported to an exception handling logic element which determines at what level the anomaly may be resolved. For example, a given train which has deviated from its plan in excess of a predetermined tolerance could be an anomaly that could be corrected simply by small changes to the adjacent trains. On the other hand, an anomaly of a larger magnitude such as a derailment which fouled a given track would cause a large scale rescheduling including use of alternate routes. Such large scale rescheduling would be moved up to a global or system wide planning level which would permit a reoptimization of the plan around that major anomaly.

There is a temporal aspect to this rescheduling activity in that the anomaly being reported must be acted on immediately for safety reasons, and then it must be acted on for short term optimization, and then it may be acted on for global rescheduling. Thus, the anomaly resolution or exception handling process can be involved in various levels of a hierarchal planning system in time sequence until the anomaly is fully resolved.

In the existing situation, the most common effect of an anomaly in present systems is to negate large portions of a predetermined schedule. In general in the freight railroad business, major perturbations to the schedule are not recovered for at least 24 hours. Unfortunately, anomalies happen with great frequency, some of them as small as loss of one locomotive in a three locomotive consist, which causes that train to have two thirds the power for which it had been scheduled. Or anomalies are simply that the engineer has not attempted, or been unable, to stay on schedule. Without regard to the cause, they occur with great frequency and as a result most freight railroads do not maintain any sort of close coupling with predetermined schedules. The performance against schedules is often so bad that crew changes are required to prevent unscheduled stops due to crews exceeding maximum allowed work time.

In the optimization process it is important to understand the total scope of what is necessary to actually achieve the minimum operating cost. Very often optimization plans are based on the concept of priority where certain elements of the operation (certain trains or certain types of shipments) are given a higher priority than others because of the fact that they are considered to be more time critical.

In a true optimization technique the notion of priority per se should be implicit but not explicit. The reason is that a given train, although of high priority in the sense that it must meet a deadline (or the impact of missing a deadline is significant), may not generate any additional revenue if it is early. To say it another way, being early may not be an advantage, but being late may cause a considerable negative impact. In a true cost optimization plan, priority must be tempered and the priority function must be delayed within the "don't be late" constraint.

One of the fundamental principals in optimization is that each element of the operation have associated with it some incremental cost in the criteria being optimized. Incremental cost can be fuel cost, hourly cost of personnel, hourly use cost of locomotives or hourly use cost times distance traveled of locomotives. The actual incremental cost factor should go into the optimization plan, including penalties.

The plan must include nonlinearities in the incremental costs to allow for the fact that at certain points in the delivery time schedule the actual cost will either go up as a step function or as a slope. As an example where there is no advantage associated with an early delivery, the failure to deliver a given cargo might be a $1000 fixed penalty if not delivered on time and an additional $1000 per hour demurrage charge if it causes a ship to stay in port.

A true optimization plan is one whereby the variables including the assignment of resources are juggled such that the overall cost is minimized. An example would be two trains that were moving down a track towards a destination, one of which was four hours late and one of which was one half-hour late, with both trains having a significant but fixed penalty for being late. The logical solution would be to refrain from doing anything for the four hour late train because of the impossibility of ever meeting its schedule, and to give the half-hour late train every opportunity to recover the half-hour and avoid the penalty of being late. In such a scenario, the four late train may be given a much lower priority than a bulk commodity train since the bulk commodity train may involve more resources being used.

In the present invention, it is the global or the overall optimization for cost which controls rather than predetermined priorities, with priorities used only as cost factors. The total cost includes the operating costs such as fuel and rolling stock utilization as well as the delivery costs caused by contractual terms and commitments. Only when all of these cost factors are taken into account is it possible to come up with a true minimum cost plan. In the known prior systems, no such plan is possible because no technique is available which actually computes the incremental cost associated with each of the decisions. As a result, suboptimal plans are often generated based on the intuition of dispatchers and planners.

PARTIAL LISTING OF OBJECTS

Accordingly, it is an object of the present invention to obviate the above deficiencies of known systems and to provide a novel system and method for scheduling the movement of a number of objects through a multipath delivery system.

It is another object of the present invention to provide a novel system and method for optimizing the movement of a number of objects through a multipath delivery system.

It is still another object of the present invention to provide a novel system and method in which a detailed movement plan is bound to the control of a delivery system.

It is still a further object of the present invention to provide a novel system and method to operate a delivery system according to a schedule such that the deviation from the schedule at any moment in time is minimized.

It is another object of the present invention to provide a novel system and method to manage the movement of carriers in a delivery system such that local conflicts are resolved with reference to the effects of such resolution on the entire system.

It is a further object of the present invention to provide a novel system and method in which conflicts in the use of system resources are reduced by managing the extent of the periods of such conflict.

It is yet a further object of the present invention to provide a novel system and method in which conflicts in the use of resources are reduced by closely scheduling and operating the use of such resources.

It is still another object of the present invention to provide a novel system and method in which the delays in a delivery system are reduced by providing a detailed and realizable plan of movement and providing a means for carrying out the detailed and realizable plan.

It is yet another object of the present invention to provide a novel system and method for providing a plan for the movement of a number of objects through a multipath delivery system which is physically attainable by the objects being moved, and which as a result can be used to control the movement of those objects.

It is yet still another object of the present invention to provide a novel system and method for providing a plan for the movement of a number of objects through a multipath delivery system in which the objects being moved are converted to time intervals for processing.

In another aspect, the present invention provides a novel method and apparatus for optimization which utilizes different levels of abstraction in the course scheduling and fine planning stages.

It is another object of the present invention to provide a novel system and method for optimizing where the amount of detail in the movement being optimized in inversely related to the solution space.

It is yet another object of the present invention to provide a novel system and method for optimizing using a rule based inference engine to provide constraints for a constraint based inference engine.

It is yet still another object of the present invention to provide a novel system and method for optimizing using the combination of rule based and constraint based inference engines in developing a movement plan, with further optimization using a procedure based inference engine.

It is yet a further object of the present invention to provide a novel system and method for optimizing with consideration of both operational and delivery costs.

In another aspect, it is an object of the present invention to provide a novel model and method of modeling capable of different layers of abstraction.

In another aspect, it is an object of the present invention to provide a novel computer and method of computing which combines simulated annealing and branch and bound techniques in developing solutions to computational problems.

It is another object of the present invention to provide a novel computer and method of computing with intelligent focusing of simulated annealing processes.

It is yet still another object of the present invention to provide a novel cost reactive resource scheduler to minimize resource exception while at the same time minimizing the global costs associated with the scheduling solution.

These and many other objects and advantages of the present invention will be readily apparent to one skilled in the art to which the invention pertains from a perusal of the claims, the appended drawings, and the following detailed description of the preferred embodiments.

DETAILED DESCRIPTION OF A FREIGHT RAILWAY SCHEDULING SYSTEM

Many of the advantages of the present invention may be understood in the context of a freight railway scheduling system, and preferred embodiments of the various components of the invention and the operation thereof are described below in such context.

Overall System.

Figure 3:
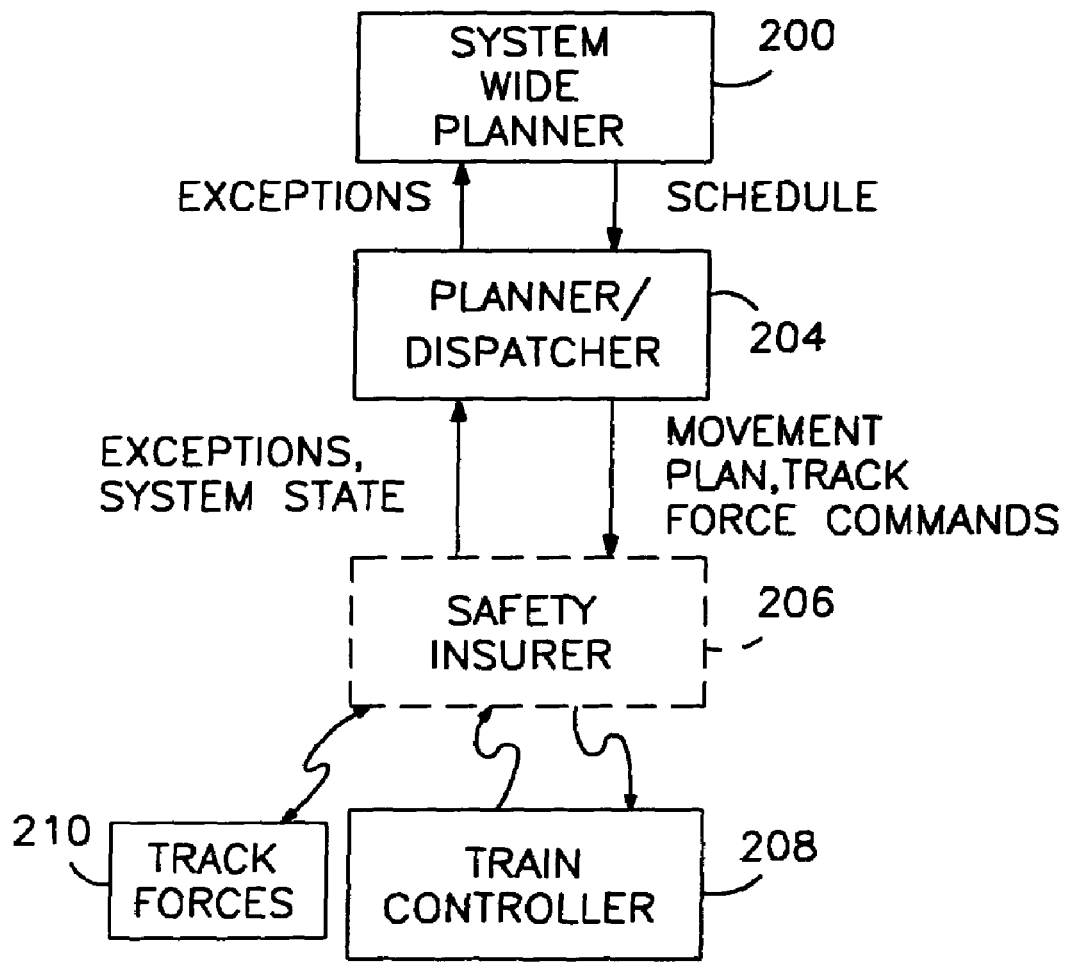
FIG. 3 is a functional block diagram of the system of the present invention.

With reference to FIG. 3, a train scheduling and control system in accordance with the present invention may include a system wide planner or order scheduler 200, a planner/dispatcher 204, a safety insurer 206 and a train controller 208.

In overall terms, and as explained further below, the system wide planner 200 is responsible for overall system planning in allocating the various resources of the system to meet the orders or demands on the system in an optimal manner. The system wide planner 200 develops a coarse schedule for the use of the various resources and passes this schedule to the planner/dispatcher 204. The planner/dispatcher 204 receives the coarse schedule from the system wide planner 200 and, as explained further below, determines a detailed schedule of the resources termed a movement plan. The movement plan may then be used by the dispatching portion of the planner/dispatcher 204 to be transmitted ultimately to the train controller 308 on board the locomotive in the trains being controlled.

The movement plan developed by the planner/dispatcher 204 may be checked by a safety insurer 206 to verify that the movements being commanded by the planner/dispatcher will not result in any of the trains of the system being placed into an unsafe situation.

With continued reference to FIG. 3, the planner/dispatcher 204 may also generate appropriate command signals for the various track elements 210 (such as switches) to configure the railway system as needed to carry out the movement plan in an automated embodiment in a system of the present invention. As with the movement plan signals, the signals to the track elements 210 may be verified for safety by the safety insurer 206.

Information regarding the position of the train and the settings of the track elements may be sent back to the planner/dispatcher.

In the event that the planner/dispatcher 204 is unable to develop a schedule for all the required services in the schedule, or in the event that a train is unable to meet such schedule, exceptions are passed back up the communication chain for handling by the next higher level as needed.

It may be noted that in each level of the system in FIG. 3, the system takes into account the effect of the size (mass) and power of the train, the various track parameters and train handling constraints on the scheduling and movement process. Track parameters include those physical characteristics of a particular track which affect the speed at which the train may traverse the track and which affect the rate of change in speed or power which occurs while a particular train is running along the track. These parameters include, for example, the grade of the track, its curvature and slope, and the condition of the track bed and rails. By generating a schedule which takes into account such track parameters, the system wide planner 200 is able to generate a coarse schedule which has a high probability of being successfully implemented during the detailed planning of the planner/dispatcher 204. Likewise, the use of such track parameters by the planner/dispatcher 304 will ensure that the developed movement plan is realistic and can be followed safely and closely by the actual train.

Similarly, all levels of the system may include train handling constraints within their determination of a coarse schedule, movement plan and the commands used to control the train. Train handling constraints include experiential and other factors by which it is known and accepted that trains should be operated. These constraints include braking techniques and switch crossing considerations to avoid derailment.

For example, a long train which has just come over the crest of a grade is considered to be "stretched" because all of its intercar couplings are in a stretched or tensioned position. As the front portion of the train begins to go down the grade on the opposite side of the crest, the cars on the downgrade tend to compress if the engine is slowed, and it may be dangerous to apply dynamic brakes (i.e., the braking system which operates only at the engine). As the couplings between cars compress as each car is slowed by the cars in front of them, the tendency for the train to buckle is a known cause of derailments. Such train handling constraints may vary by the size and type of train and are taken into consideration at each level of the system.

The planner/dispatcher 204 of FIG. 3 has two processes: a planner/dispatching function and a movement planner. The planner/dispatching function is responsible for the movement of a train from its dispatch (i.e., its earliest departure time) until its arrival at its destination (port, mine, yard or terminal). The movement planner, as detailed below in connection with FIG. 4, takes the coarse schedule initially determined by the system wide planner or order scheduler 200 and generates a detailed movement plan utilizing the details of the physical attributes, the track parameters and train handling constraints.

The movement plan is a time history of the position of the trains throughout the plan and takes into account the physical forces which are expected to occur during the actual carrying out of the plan. For example, the movement planner takes into account the inertia of the train and the track parameters, etc. to provide a movement plan in which the fact that the train does not instantly reach its desired speed is accommodated.

Thus, the movement planner takes into account the speed changes and/or time effects of the various constraints over the specific track upon which the trains are being, planned. For example, if the movement planner determines that a particular train will be placed on a siding, the movement planner accounts for the fact that the train may have to slow somewhat for switching and, particularly if the train is stopped on the siding, that the subsequent acceleration will not be instantaneous but will be an increase in velocity over a finite period of time in accordance with locomotive weight, track adhesion, weight of the train, grade and curvature. In this way, the movement planner generates the exact trajectory which the train is expected to follow.

This detailed movement plan should be contrasted with systems in the prior art in which plans are generated with respect, at best, to an average length of time which similar trains have required to traverse, or are expected to require to traverse, the same track segments. While, on average, the prior art averages of simulations may be fairly accurate, they typically assume characteristics which are not possible to accomplish in the movement for actual train.

For example, the models of the prior art may model the travel between two segments as an average speed over those two segments. If the movement plan is generated simply from the average speed, the movement plan will be inaccurate in anticipating the trajectory of the train because the average speed in the model cannot instantly be obtained by the actual train. When such an average speed is used in generating a movement plan, the train cannot actually implement such a plan, and such plans cannot be used to control the trains.

In contrast with the prior art, the present invention takes into account not simply the average speeds between points but other factors which affect train speed and the time to various points between the segment ends. By so doing, the movement planner of the present invention accurately knows not only when a train will arrive in the end of a particular segment but also where the train should be at any given time while in the middle of such a segment. Because the movement planner knows the exact time that a train under its control will be at a particular facility, such as a siding or an alternative track, it may schedule meetings and passings more closely than in the prior art.

Figure 4:
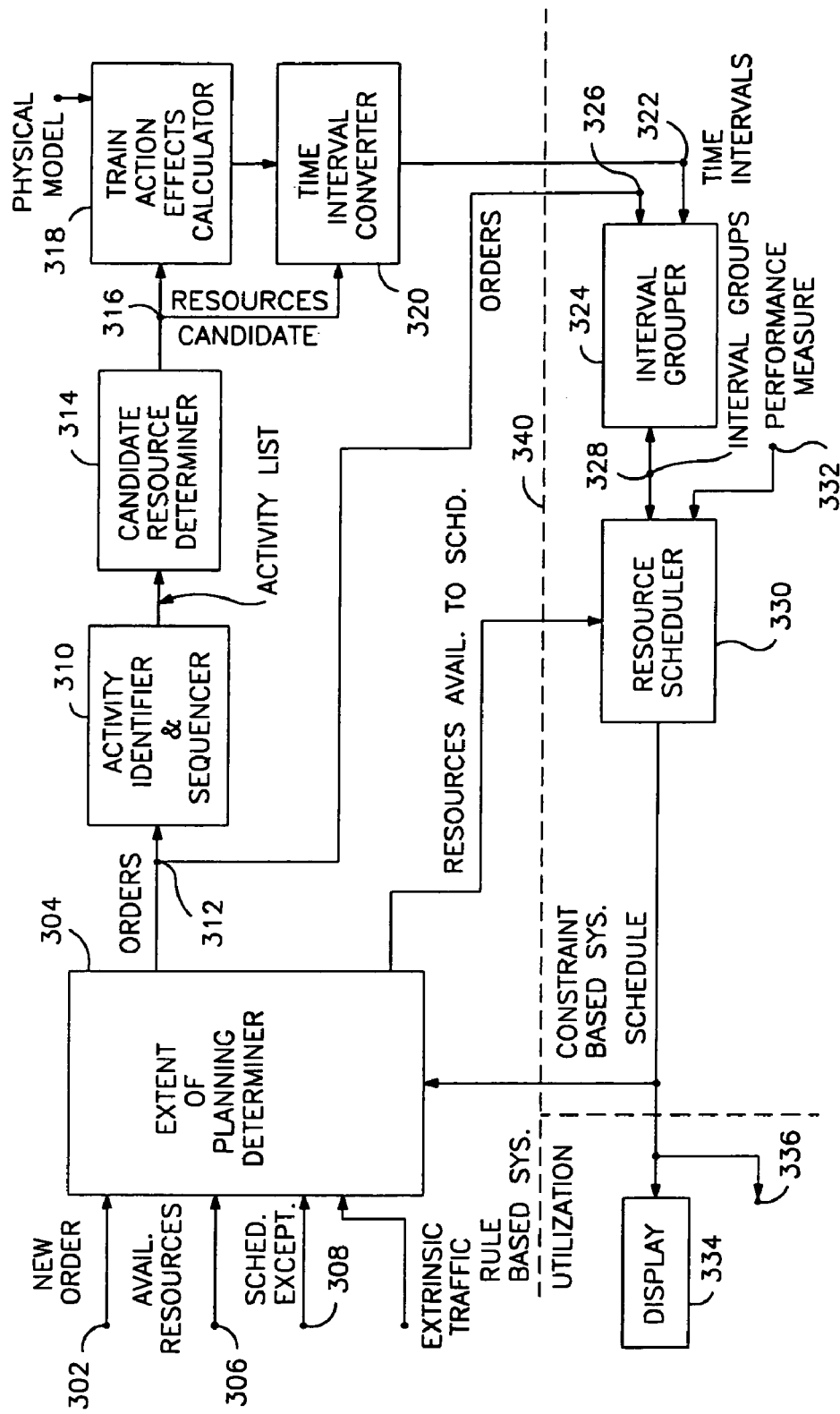
FIG. 4 is a functional block diagram of the system wide planner or order scheduler of FIG. 3.

In the movement planner of FIG. 4, either fixed block or moving block rules may be used. Fixed block rules reflect the segmentation of tracks into fixed blocks or segments. Generally, in the prior art, the block size was set at the distance that the slowest stopping train would take to stop. In train following situations, a following train would be kept behind the leading train by at least a multiple of the length of the fixed block.

Typically, the headway between a following train and the leading train would be fixed at multiples of a fixed block size. Because the system of the present invention uses a very precise control geared specifically to the capabilities and dynamics of the specific trains being handled, the separation between trains can be made smaller than in the fixed block systems as they can be made to reflect the actual braking distance of the specific trains. Thus, the system of the present invention is not based on a "worst case" braking scheme and the throughput of the rail system is improved thereby.

With continued reference to FIG. 3, the movement plan generated by the movement planner of FIG. 4 is used by the planner/dispatcher 204 to control the operation of the trains. In one embodiment, selective portions of the movement plan can be displayed to assist operating personnel in dispatching trains and in correctly configuring the various track elements (switches, signals, etc) as called for in the movement plan. In another embodiment of the present invention, the movement plan can be automatically dispatched by the planner/dispatcher 204 via the communications infrastructure to send the appropriate portions of the movement plan to the train controllers 208 aboard the locomotives and to remotely control the various track elements.

Both the movement plan signals and the track force controlling signals may be independently verified for safety by the safety insurer 206 which, independently and without regard to schedule, confirms that the particular movements being ordered and settings of track forces are safe and appropriate. The safety insurer may be any suitably programmed computer, particularly a computer with built-in hardware redundancy to eliminate the possibility of a single-point failure.

It is important to note the close tie between the movement plan trajectory as determined by the planner/dispatcher 204 and the train movement which is implemented by the train controller 208. If the trajectory which was planned by the planner/dispatcher 204 was not sufficiently detailed, including factors such as inertia track parameters and train handling, the train controller 208 would not be able to implement the plan and could be expected to inundate the planner/dispatcher with exception notices.

Order Scheduler

With reference now to the system-wide planner or order scheduler 200 illustrated in FIG. 4, it may include an extent of planning determiner 304, an activity identifier 310, a candidate resource determiner 314, a train action effects calculator 318 and a time interval converter in the rule based inference engine shown above the dashed line 340. The order scheduler 200 may also include a constraint based inference engine comprising an interval grouper 324 and a resource scheduler 330. A display 334 and terminal for other output devices (not shown) may be provided in a utilization section.

As shown in FIG. 4, a new order for rail service may be applied via an input terminal 302 to an extent of planning determiner 304. The order may be any request for service and may include an origination point, an earliest pickup time at the origination point, the destination point, the latest delivery time to the destination point (after which penalties are applied), a cost function which defines the penalty to be paid for late delivery and/or an incentive award for earlier delivery, and any other information appropriate to the class of the order.

An order may take the form of a request to move a specifically loaded train from point A to point B, to provide a round trip service between two points, to execute a series of round trips with unspecified trains, to schedule a maintenance period for a specific segment of track or other rail equipment, etc. Thus, an order to pick up coal from a mine and deliver it to a port may require one or more trips, with each trip requiring a train resource, a sequence of track resources, mine loading resources and a port unloading resource. The sequence of track resources is, of course, dependent upon the selection of a route if alternative routes are available.

The extent of planning determiner 304 also receive on an input terminal 306 the data as to the available resources. A resource may be any entity which may be scheduled and for example, may be a locomotive, a freight car, an entire train, terminal equipment such as a loader or unloader, track segments and any fixed or moving block associated therewith, or track or train maintenance equipment.

The extent of planning determiner 304 may also receive any schedule exceptions via an input terminal 308. A schedule exception may be any previously scheduled event which will not be satisfied within a specified time interval deviation from the schedule and may require replanning in conformity with company policy.

The extent of planning determiner 304 may also receive any extrinsic traffic which is to be included in the plan. Extrinsic traffic is any traffic which is not subject to scheduling by the movement planner, e.g., prescheduled traffic. By way of example, an extrinsic schedule exemption for the typical railway freight system may be the inviolate schedule of a passenger train over the same railway track system.

The extent of planning determiner 304 may be any suitable conventional apparatus, preferably appropriately programmed general purpose computer or a special purpose computer, with the capability of analyzing the available data to generate the orders as to which scheduling is to be accomplished.

The extent of planning determiner 304 provides orders to an activity identifier and sequencer 310 via terminal 312 and the activity identifier and sequencer 310 provides an activity list to the candidate resource determiner 314.

An activity is an event which requires one or more resources to be assigned for a period of time. By way of example, an activity may be the loading of a train with a bulk commodity which requires the assignment of a train, the assignment of loading equipment, or the assignment of track at and in the vicinity of the loading point, each for a period of time depending upon the capacity of the train and the characteristics of the loading equipment.

The activity identifier and sequencer 310 in turn provides a list of the available resources from terminal 306 which have the capability of performing the identified activity in the necessary time sequence. The activity identifier and sequencer 310 may be any suitably programmed general purpose or special purpose computer with access to the requisite data.

The list of candidate resources from the activity identifier and sequencer 310 may be provided via the terminal 316 to both the train action effects calculator 318 and the time interval converter 320. The train action effects calculator 318 also provides an input signal to a time interval converter 320 as described below. The train action effects calculator 318 may be any suitable conventional appropriately programmed general purpose or special purpose computer with the capability to derive from data as to the composition of the train the effects which the terrain over which the train travels has thereon. While not limited thereto, the effects of terrain on the acceleration and deceleration on the train are particularly important. The calculator is provided with the data base from the physical model of FIGS. 7 and 8 via a terminal 321.

The time interval converter 320 may likewise be suitable conventional general purpose or special purpose computer capable of converting each of the candidate resources to a time interval which takes into consideration train action effects.

The output signal from the time interval converter 320 may be applied by way of a terminal 322 to the interval grouper 324. The interval grouper 324 also receives via terminal 326 the orders from the extent of planning determiner 304. The output signal from the interval grouper is applied as a group of time intervals by way of a terminal 328 to a scheduler 330.

The interval grouper 324 may be any suitable conventional general or special purpose computer capable of calculating the total time associated with the execution of each trip using the candidate resources.

The resource scheduler 330 which receives the interval groups also receives by way of an input terminal 332 data as to the performance measure by which schedules are evaluated. In addition, the scheduler 330 receives a signal from the extent of planning determiner 304 indicative of the resources available for the scheduling process. The output signal from the schedule 330 is applied to any suitable conventional display 334 and to any other utilization device (not shown) by way of terminal 336. The output signal from the scheduler 330 is the schedule which is also fed back to the extent of planning determiner 304 as discussed below.

The resource scheduler 330 may be any suitable conventional general purpose or special purpose computer capable of scheduling the passage of the various trains over the track system with a high degree of optimization. However, and as discussed infra in greater detail in connecting with FIG. 5, the resource scheduler 330 is desirably one which uses the well known simulating annealing techniques to approximate the optimum solution.

In operation, the extent of planning determiner 304 determines the extent of planning to be performed from new orders and/or schedule exceptions. With new orders, the extent of planning determiner 304 uses a set of rules defined by standard operating procedures, company policy, etc. as well as the current schedule from the scheduler 330 and the currently scheduled train movements or maintenance actions to determine those actions eligible to be scheduled. Any extrinsic traffic must also be considered in determining the extent to which planning is to be accomplished.

By limiting the planning, confusion among personnel and the inherent inefficiencies caused by constant schedule changes as well as the inefficiency resulting from changes to on-going or imminent activities may be avoided.

The orders from the extent of planning determiner 304 are received by the activity identifier and sequencer 310 and are used to generate an activity list. For each order, a list of activities required to satisfy the order is identified. The activity list includes the sequence of track segments (i.e., route) which must be traversed in filling the order. Route selection may be based upon cost analysis, upon previously determined company policy or standard operating procedures. The activity list is, of course, ordered sequentially so that it constitutes a sequential list of each activity to be performed in the fulfilling of the order to be scheduled.

The activity list is supplied to the candidate resource determiner 314. For each of the resources on the activity list, the possibility of assigning such resource to the specified activity is analyzed and a selection of rolling stock resources is made, typically based upon limitations of the rolling stock or upon company policy. For example, a particular destination such as a port for coal hauling operations may not be able to unload certain types of rolling stock. In the same manner, a particular type of train with a specified locomotive power may not be able to move over the grade associated with the selected route without overheating the engine or stalling.

This list of resources which are candidates for each of the activities on the activity list may be provided to the train action effects calculator 318 and the time interval converter 320 as candidate resources. Thus the candidate resource determiner 314 serves to limit the potential assignment of rolling stock and/or other resources to the activities which it has the capacity to perform.

The train action effects calculator 318 and the time interval converter 320 together compute the time required to complete the activity for each of the activities listed on the activity list it receives and for each of the candidate resources. For the movement of a train (loaded or unloaded), over a sequence of track segments, this computation may be performed by a commercially available train performance calculator such as the AAR TEM model.

Loading and unloading tasks may be computed by dividing the capacity of a train by a constant loading (unloading) rate of the equipment at the terminal. This rate may be variable, in which event the time computation must take the nonlinear characteristics of the equipment into consideration. Additional time should be included in the loading/unloading process to allow for positioning the train at the loader/unloader equipment. The time computed for each of the activities on the activity list is adjusted for train action effects for each of the alternative resource candidate, and the time interval information is provided to the time interval converter 320.

The time interval converter 320 translates the sequence of activities on the activity list to a sequence of time intervals. This is accomplished by using the data from the train action effects calculator 318 for each of the activities identified by the candidate resource identifier 314. In the event that alternative resources are available for accomplishing any activity, then all alternative time intervals are computed for each of the activities. Certain types of activities, such as maintenance activities, are provided with an externally specified interval of time to completion and thus do not require calculations. The time interval converter 320 passes a list of time intervals grouped by resource as well as by time to the interval grouper 324.

The interval grouper 324 receives the list of grouped intervals from the time interval converter 320. The interval grouper 324 also receives the orders from the extent of planning determiner 304 and groups the time intervals necessary to fulfill the orders in the logical sequence. For trips, the interval grouper 324 provides the time intervals required to perform the entire trip, but indicates which of the time intervals may be divided, if necessary, into smaller intervals by the presence of gaps.

Gaps represent the time periods which may be allowed to pass between the completion of one time interval and the initiation of the next time interval in the group. A gap may be the existence of a siding or other capacity for holding a train for an interval of time, e.g. to permit the passage of a second train. Any time interval immediately followed by a gap (e.g., one associated with the passage of a train over a section of track to a siding) may be said to be a "gap-able time interval". The interval groups defined by this process are passed to the resource scheduler 330 as interval groups.

The interval groups are passed to the resource scheduler 330 which also received from the extent of planning determiner 304 a list of the resources available to schedule. Performance measures related to the orders which are provided by the customer are also provided to permit cost evaluation of the schedule as described below. The resource scheduler 330 thus conducts a search for a schedule which satisfies the resource availability constraints, satisfies the internal constraints and minimizes the performance measures.

As earlier indicated, the search for an acceptable schedule may employ various suitable conventional techniques, but the preferred technique is that of simulated annealing discussed above. If no acceptable schedule is available because of the length of the group time intervals, the interval groups are returned to the interval grouper 324 for division at the gaps into smaller groups. After division, they may be returned to the resource scheduler 330 and the scheduling process repeated. This scheduling process continues with smaller and smaller time intervals until the interval groups can no longer I)e divided, as there are no gap-able time intervals in any group of time intervals.

At any time that the resource scheduler 330 can provide a schedule which meets the restraints placed upon it, that schedule is passed to the display unit 334 as well as any other selected utilization means attached to the terminal 336. This schedule is also applied to the extent of planning determiner 304 as part of its data base where the yet-to-be-completed components of the schedule are treated as schedule exemptions in the determination of further planning.

In the event that the resource scheduler 330 cannot provide a schedule which conforms to all of the constraints, the best available schedule is reported along with an indication that the schedule has unresolved conflicts. Information as to the resources and activities involved in the conflict are identified.

Figure 1:
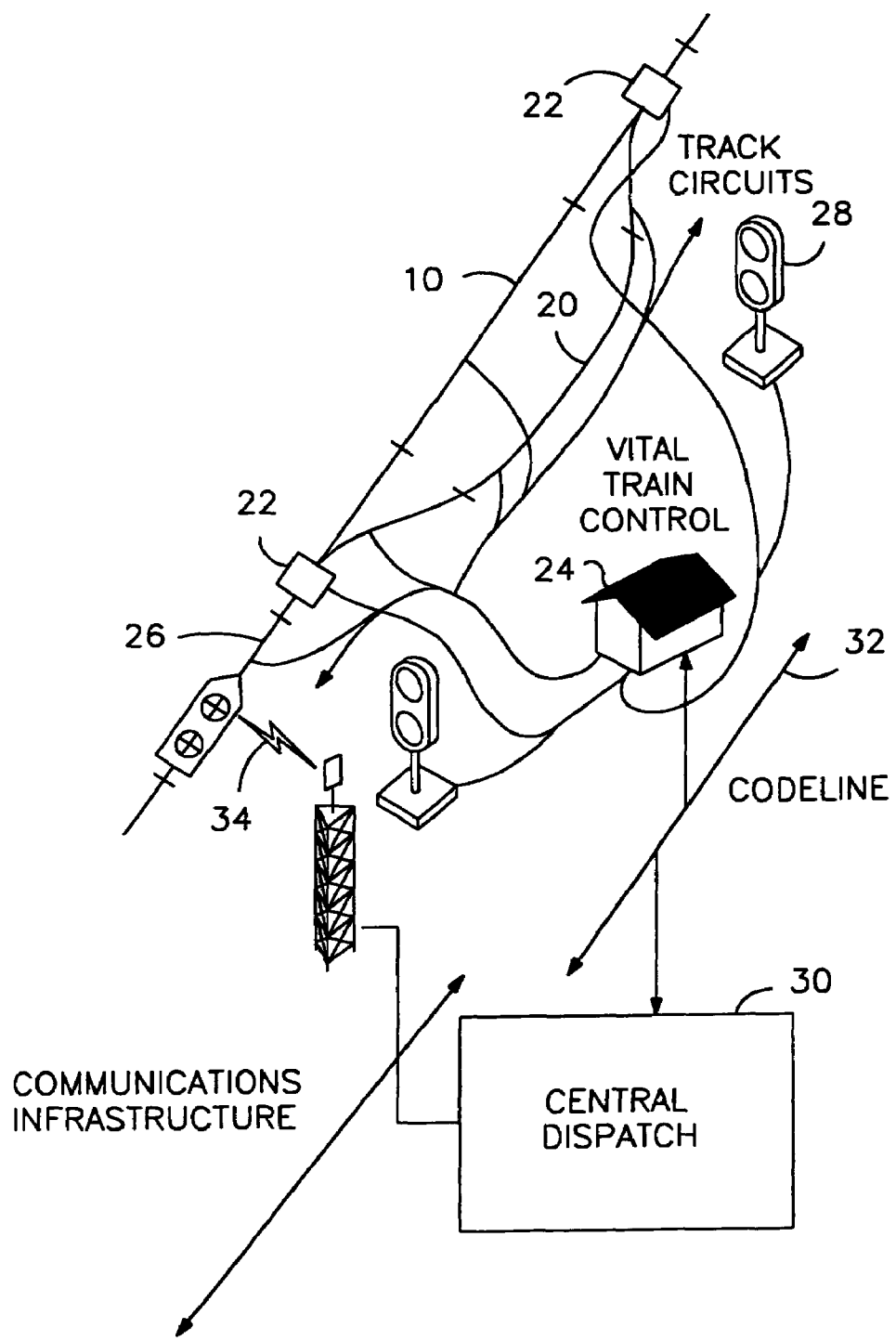
FIG. 1 is a schematic block diagram of the prior art systems.
Figure 2:
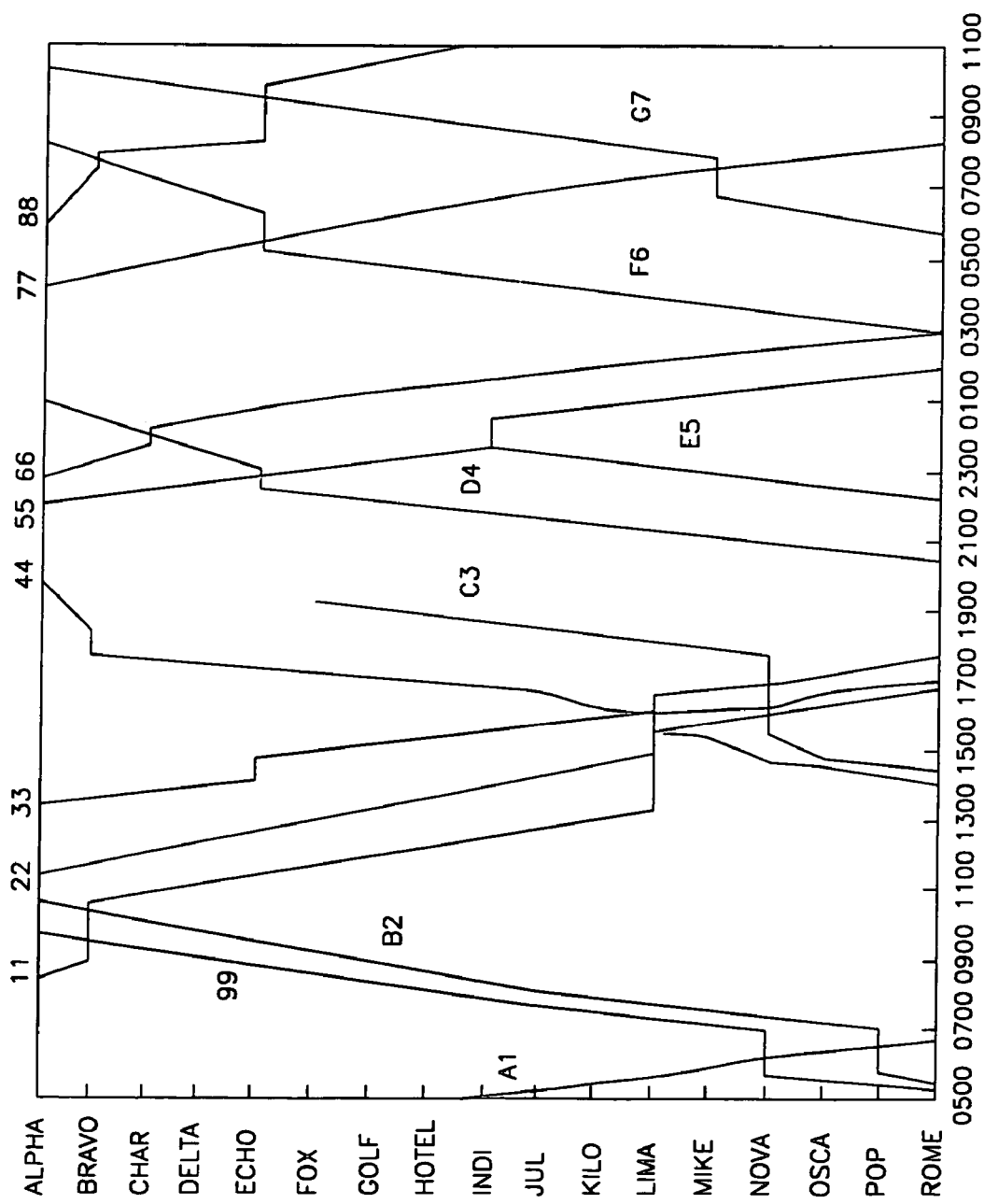
FIG. 2 is a pictorial depiction of a prior art stringline used in the scheduling of an embodiment of a system of the present invention.

The display 334 conveniently displays the resulting schedule for user examination. A popular display is a standard string-line diagram used by the railroads such as illustrated in FIG. 2 above.

Note that the components in the portion of the order scheduler 200 of FIG. 3 above the horizontal dashed line 340 in FIG. 4 are components of a rule based system, i.e., a rule based inference engine which provides the constraints applied to the resource scheduler 330 and interval grouper 324. It is one aspect of the invention that both rule based and constraint-based systems are utilized for scheduling orders.

By this combination of inference engines, unusual efficiency in calculating the schedule is obtained.

The resource scheduler 330 performs globally optimized scheduling of train resources using an abstraction of train movement and resources. Choosing an abstraction for resources which leads to a realizable solution in near real-time is key to reducing the search space required by the movement planner in developing a detailed movement plan.

Preferably, the resource scheduler 330 is implemented in the Harris Corporation developed Constraint Propagation Expert System (COPES) Shell. This shell provides a Fill', virtual engine for developing distributed algorithms which may be implemented on one machine, or distributed over any number of machines in a TCP/IP environment. This engine provides a constraint propagation inferencing environment with built-in communications capabilities and a unique discrete-simulation capability. It is wellknown as described in the 1993 Goddard Conference on Space Applications of Artificial Intelligence", page 59.

One of the advantages of developing the resource scheduler 330 in COPES is that it can receive asynchronous requests from the extent of planning deter-miner 304 and (a) stop the scheduling process, returning the best solution found to this point in time, or (b) abandon the current scheduling process and start a new scheduling request based on recent system changes such as deviations from scheduled activities.

Figure 5:
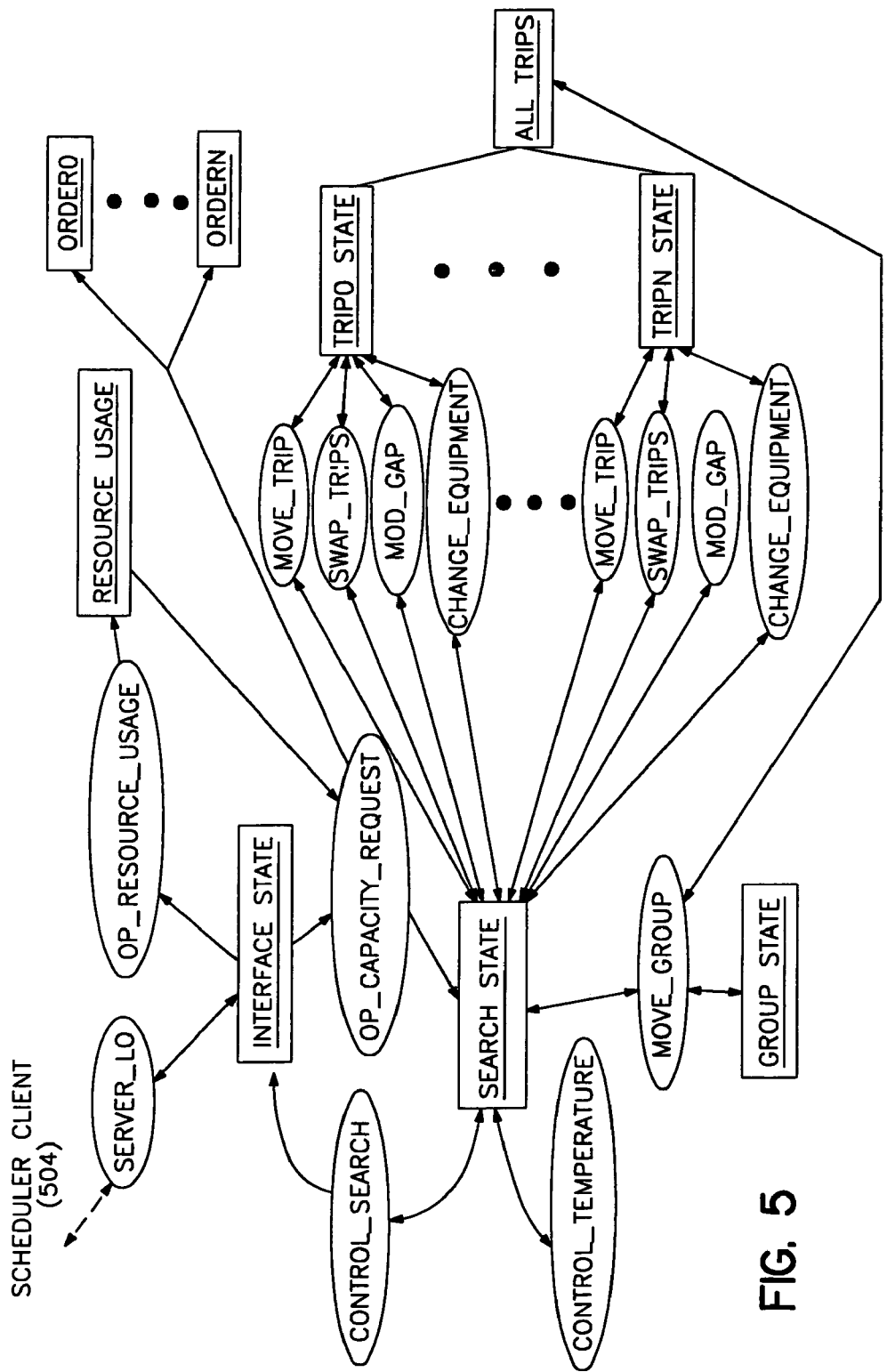
FIG. 5 is system flow diagram of the implementation of the resource scheduler of FIG. 4 in a COPES shell.

The resource scheduler 330 shown in FIG. 5 is a UNIX process which schedules resources so as to fulfill a set of orders for rail service in a manner that satisfy a set of user-defined constraints. Multiple orders may be scheduled either in batch or sequentially. As earlier indicated, an order also has a time interval during which the service is to be provided and a cost function which defines the penalty to be paid for late delivery and/or the incentive award for early delivery. Once the resources are selected, the activity lists can be converted to a sequence of time intervals by incorporating the train effects captured in the resource usage data and these intervals can then be grouped together. These groups of time intervals can then be moved relative to one another using a novel search procedure referred to as Focused Simulated Annealing to satisfy the constraints and obtain a lowest cost solution.

Focused simulated annealing is a distributed version of simulated annealing written in COPES. It follows the traditional flavor of simulated annealing in the random generation of move operators with an energy function which is to be minimized.

A. Generation of potential moves via constraints is random and distributed.

B. Optimization allowed to take some bad moves in early stages.

C. As "temperature" is reduced less bad moves are allowed.

D. In final phases only good moves allowed.

Variables include starting temperature and the number of temperature reductions steps. For each temperature reduction step it also includes the number of reconfigurations, the number of successes and the number of attempts.

What distinguishes this approach from traditional simulated annealing, is its capability to focus its attention in an intelligent manner on critical areas. In the early phase of search this focus is limited to certain guiding information passed by the planner such as the likelihood of the degree of constraint of the solution along with goals such as minimum siding-usage, or earliest delivery, etc. This information is used by the focused simulated annealing technique to determine whether to use certain move operators in the search process, and if so how often to fire them relative to other operators. The generation of move operators is therefore more directed, although still random, than in the use of traditional simulated annealing techniques.

Focused simulated annealing is distributed by allowing constraint routines attached to each trip to make decisions themselves about how useful modifying the current trip (e.g., start time, equipment assigned) would be to the overall situation. Each routine can schedule its associated trip for modification on a random basis with the time range being a variable reflecting the importance of the next move of the trip (e.g. a larger time range indicating less importance).

The resource scheduler 330 employs a dynamic, distributed, robust, and efficient version of simulated annealing written in the COPES shell. It is dynamic in that its behavior may be controlled by parameters passed with scheduling requests by the system wide planner (such as demurrage costs in the form of a polynomial cost function), by parameters defined in the COPES database, and by information inherent in the scheduling problem itself It is a distributed algorithm in that train trips are COPES class objects each having constraint objects bound to them which fire independently of each other. The solution thus derived must be more independent of the problem domain than is the case with more sequential algorithms and is therefore a more robust approach. It is an efficient implementation in that it employs a compact representation of each resource required as COPES objects with availability profiles and a temporal logic approach which manipulates these availability profiles in an efficient manner as a trip is added or removed. The temporal logic also considers constraints such as moving block distances. Global costs of such a move are modified as a side effect.

The operation of focused simulated annealing in COPES in the resource scheduler 330 of FIG. 4 is illustrated in FIG. 5. With reference now to FIG. 5, a constraint-based system flow of a such a resource scheduler is illustrated. The bold names in ovals (such as op_resource_usage) are the constraint routines (they are not limited to reducing the search space but may also generate solutions). They are only fired by the COPES inference engine when a class variable to which they are bound is modified. The names showing in rectangular boxes (such as resource_usage) are class objects with state variables not shown in the interest of clarity.

There are multiple instances of some class objects such as orders and trips. Each trip instance, such as "trip0_state" is actually composed of trip state variables, and trip_resource class objects defining the sequence of resources necessary to complete the trip. Each order is composed of enough trips to satisfy the order. Constraints are bound to each trip and are the primary move operators to explore the search space.

The time interval converter requests a schedule from the resource scheduler 330. The server_io constraint fires and moves this request into the interface state class which causes the op_resource_usage constraint to fire. This constraint stores the regenerated resource usage times (from the time interval converter) for each train type using each resource. It also stores information about siding possibility between two tract segments.

Requests for scheduling are now received via the op_capacity_request message. This message contains information about the order as described earlier, search goals, and constraints. The op_capacity_request constraint generates order class objects for each order, and enough train trips to satisfy each order. It notifies the control_search constraint to begin Focused simulated annealing via the search_state class object.

Control_search initializes the search and annealing parameters and sets up for the first phase search. It activates all selected trip constraints and randomly schedules them for firing. The schedule for firing is a discrete-event queue reflected by scheduled modification of class variables in COPES. As each move operator is fired it checks to see if one of the simulated annealing parameters indicates that a change is required. If a change is required, the operator notifies the control_temperature constraint which will lower the temperature and re-initialize search parameters for the next temperature.

At the end of the first phase, the control_search starts another annealing pass with half the number of attempts allowed at each temperature and with no higher energy steps allowed during this phase. Because the search is in a reasonable global optimal neighborhood, it is then desirable to focus on better local solutions. Upon completion of the final phase, a directed search process is performed to further refine the schedule and to compress the schedule if desired.

In the event that the resource scheduler cannot find a schedule which satisfies the constraints, it returns the best possible schedule along with an indication that an exception has occurred and the identity of the resources and activities involved in the exception.

The move operators performing the actual search are described below. Each one is an instance of the constraint routine bound to an instance of a trip class. The behavior of the move operators is variable depending upon the phase of the search, goals of the search, and their likelihood of improving the solution. At lower temperatures the move_trip and the mod_gap move operators reduce the start time range they will consider for the attached trip. This moves the emphasis from global to local at lower temperatures. The change equipment is only fired if it is determined at a low temperature that the train equipment is over constrained in its current assignment. The move_group operator is only fired at the end of phase one and if a tightly constrained situation is indicated.

At lower temperatures in the final phase, the move_trip and mod_gap operators determine how likely they are to help the search by looking for over-utilization of availability profiles describing their resource usage. If such over-utilization is detected, then the operators schedule themselves to fire randomly but closer in time than would otherwise be the case. The concept of energy is a weighted combination of resource exceptions, operating costs, and goals such as earliest delivery. The energy function gives more emphasis to the most critical resources (e.g., mine, trains).

The following are the move operators used in the preferred system:

A. move trip—a constraint which moves a trip (which includes all trip resources and considers scheduling constraints, and costs). It moves the trip back if the cost is no better. However, early in simulated annealing the cost is allowed to be worse depending upon the temperature and the oracle decision, avoiding local minimum solutions.

B. swap trip—a constraint which swaps two trips (which includes all trip resources and considers scheduling constraints, and costs). It moves them back if the cost is no better.

C. mod_gap—a constraint which utilizes the concept of a slack scheduling percent to try to add gaps between resource utilization to minimize conflicts. These gaps may only be at places where sidings are found, thus providing an abstract siding capability. It tries to minimize the number of gaps introduced.

D. change_equipment—a constraint which assigns a different train type to this trip when trains are over constrained.

E. move_group which moves a group of trips to take advantage of the time available for scheduling. Without it, a tight scheduled would have gaps of time between groups of trains which are not utilized.

In one embodiment of the present invention, the scheduling system utilizes a cost reactive resource scheduler to minimize resource exception while at the same time minimizing the global costs associated with the solution. For a given set of orders, resource exception is the amount of time that two or more resources are in conflict, e.g., the duration of time that two trains are scheduled to be using the same track at the same time. These two goals of minimizing resource exception and minimizing global costs are inversely related, where reducing resource exception typically means increasing global cost. This is due to the fact that a low resource exception solution can always be found by delaying the start or arrival of trains sufficiently. This means less traffic can flow over time, however, and thus more cost is incurred in such a schedule. A cost reactive scheduler may be used to develop a schedule by evaluating the resource exception and the cost associated with moves resulting in a schedule which is not only resolvable, but represents a more minimal cost solution. Since the movement planner is designed as a hierarchical system, and the abstraction used for resources and movement by the scheduler leave room for the movement planner to resolve minor conflicts, the resource scheduler does not have to remove all resource exceptions for a successful solution to be found.

After experimentation with many different orders for train resources, a wide variety of track architectures, and differing costs functions associated with the orders, it has been determined that a scheduler that can provide a schedule where the total resource exception time was no more than approximately 1% of the total unopposed trip time for all orders results in a resolvable schedule at the lowest global cost. Accordingly the cost reactive scheduler comes as close to this solution, i.e., target total resource exception time of 1% of the total unopposed trip time, as possible, without going under it, to minimize the resultant global cost. The cost reactive scheduler is able to achieve this minimum global cost by evaluating the "goodness" of each move in terms of resource exception and cost associated with each move.

As discussed in more detail below, the cost reactive scheduler does not resolve each scheduling problem in the same way. The cost reactive scheduler initially classifies the set of orders for train resources and then generates a schedule using scaling parameters and acceptance criteria which are dependent upon the classification of the scheduling problem. For example, the cost reactive scheduler may initially classify a set of order for train resources into one of four categories:

Cost Constrained and Resource Unconstrained
Cost Constrained
Normal
Resource Constrained If it appears that there is plenty of slack in the solution space such that achieving the 1% target resource exception will not be a problem, the scheduler will classify the problem as "Cost Constrained" and will emphasize cost. If it appears that there is excessive slack in the solution space, the scheduler will classify the problem as "Cost Constrained and Resource Unconstrained" and will emphasize reducing cost even more. If the scheduling problem appears to have insufficient slack to achieve the 1% target resource exception, the scheduler classifies the problem as "Resource Constrained" and w emphasize reducing resource exception at the expense of cost. All other scheduling problems may be considered ordinary and have a straight forward solution and may be classified as "Normal".

Based on this classification of the scheduling problem, the cost reactive scheduler will determine a scaling parameter which may be applied to the resource exception or the cost associated with each move to emphasize either the resource exception or the cost as a function of the classification of the scheduling problem. Throughout the search phase, the cost reactive scheduler searches for moves that approach the target resource exception of 1%. Unlike previous schedulers which used focused simulated annealing to search for scheduling solutions having 0% resource exceptions, the cost reactive scheduler accepts a lesser solution, in order to preserve moves for later in the search phase that would not otherwise be available if the 0% resource exception solution was initially accepted. Because the reactive scheduler is not searching for the "perfect" or 0% resource exception, the scheduler may accept a move where the result of the move results in an increase of the cost or resource exception. However, a schedule with minimal global cost will result from searching for moves that approach the target resource exception of approximately 1% of total unopposed trip time for the set of orders for train resources.

Figure 12:
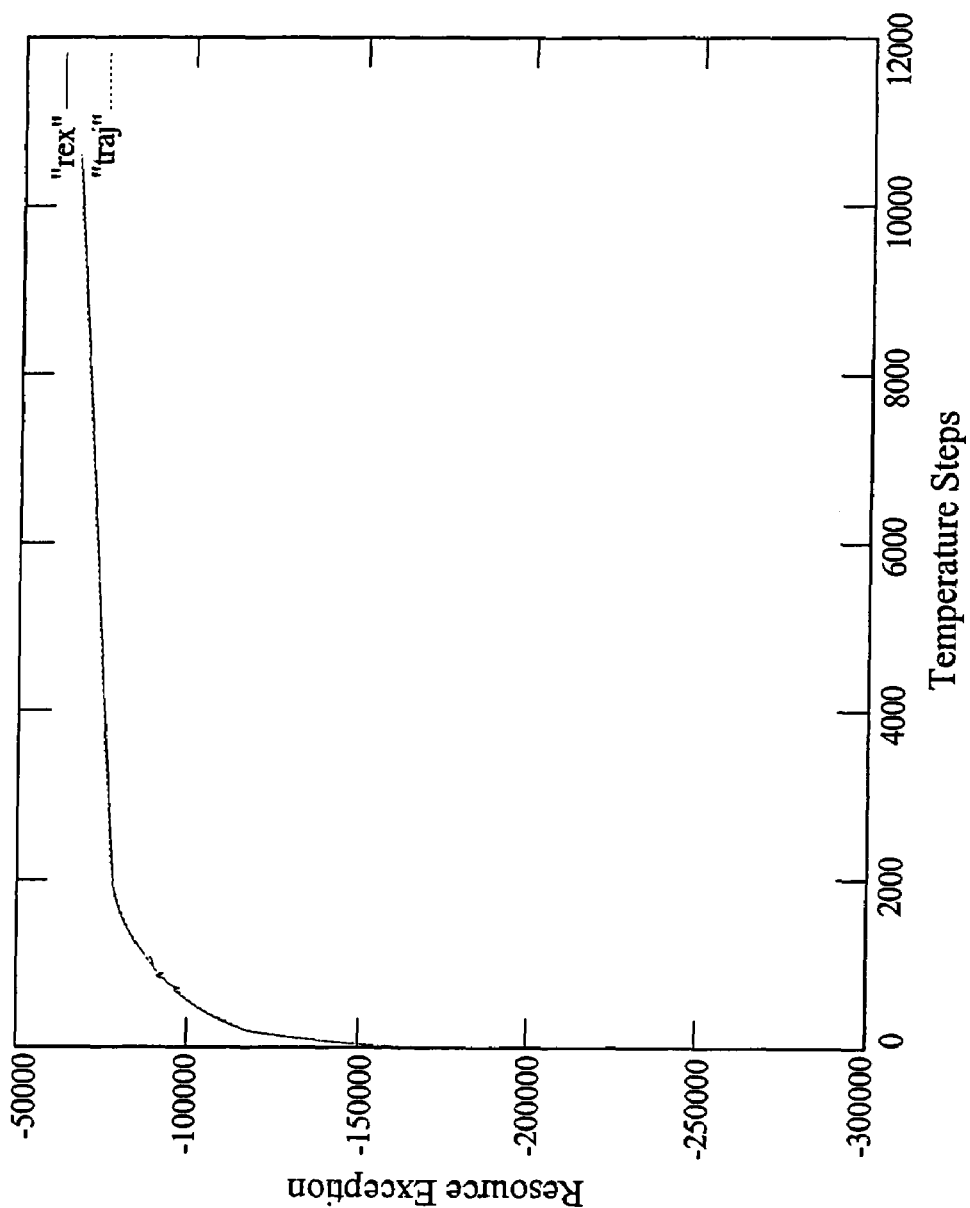
FIG. 12 is a graphical representation of the ideal trajectory of the target resource exception for the search phase of the cost reactive scheduler.

With reference now to FIG. 12, a graphical representation of the search phase of the cost reactive scheduler is shown as a plot of resource exception versus temperature steps—where temperature steps represent the end of several move operations in the search. FIG. 12 shows a plot of the ideal trajectory of the 1% target resource exception as a dashed line versus the solution generated by the cost reactive scheduler as a solid line. In this plot resource exception is in units of time (seconds) and more positive resource exception means an improvement.

With continued reference to FIG. 12, a scaling parameter was used to normalize and weight a change in resource exception in a given search operation so that a change in cost could be compared directly with resource exception to determine whether the move is good or not. Depending upon the scaling parameter used by the scheduler, the trajectory can be shifted up or down the resource exception axis resulting in a higher or lower final resource exception value.

In the current embodiment of the scheduler, the initial scaling parameters are chosen in an effort to achieve the 1% target resource exception. The scaling parameter may comprise two components, a normalizing component and a biasing component. The normalizing component is determined during a first phase of the search. The biasing component is determined after each move and forces the resource exception towards the 1% trajectory.

With continued reference to FIG. 12, the ideal trajectory was represented by a polynomial derived from a successful run of a prior art scheduler that does not contain the cost reactive modifications of the present invention. The solution of the cost reactive scheduler (solid line) can be seen varying above and below the trajectory during the search. The effect of the cost reactive modifications is to pull the actual values toward the trajectory.

Figure 13:
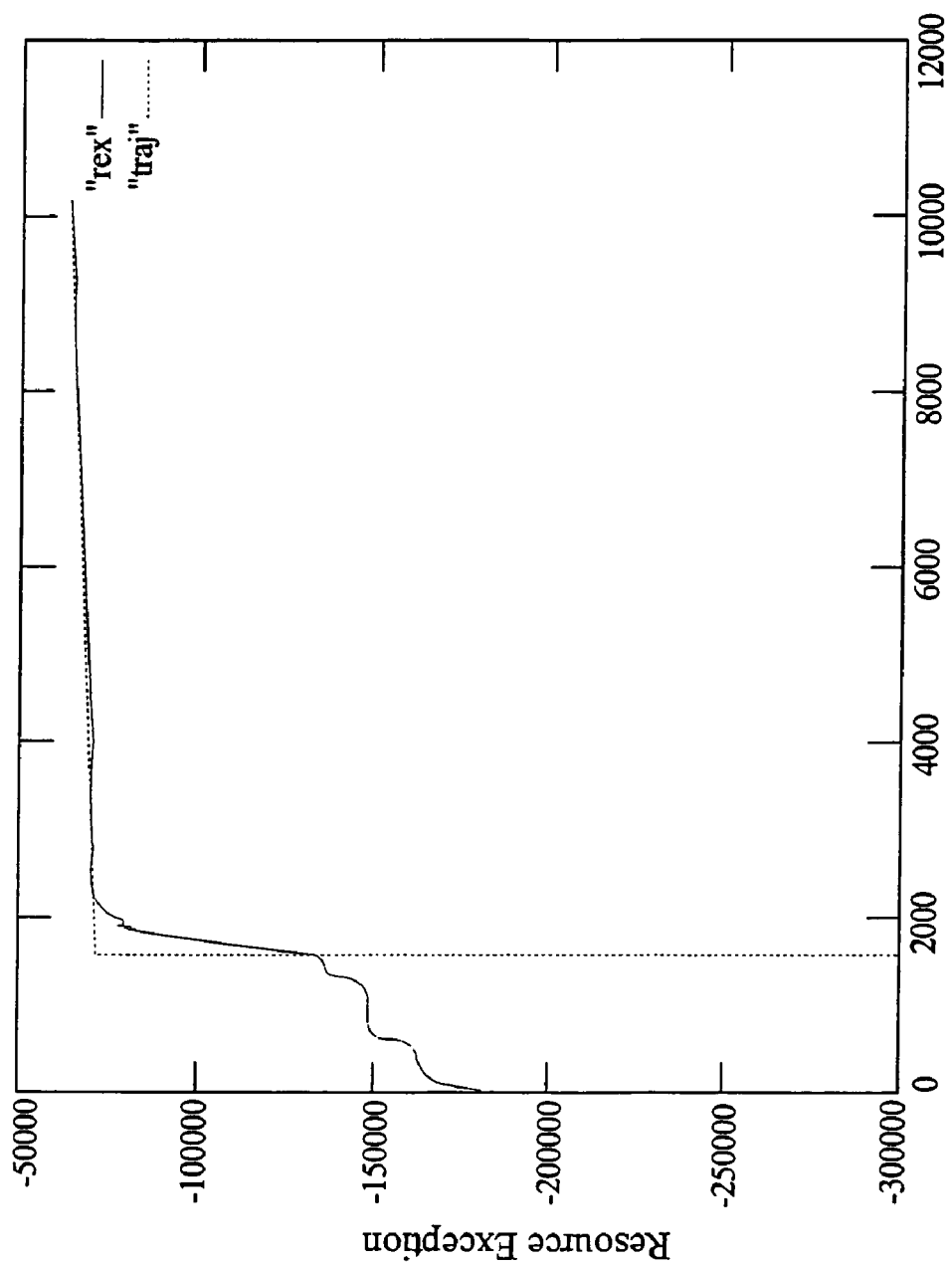
FIG. 13 is a graphical representation of the simplified trajectory of the target resource exception for the search phase of the cost reactive scheduler.

With reference now to FIG. 13, a simplified piece-wise linear approximation of the idealized trajectory was found to accomplish the desired goal in a more efficient manner than by deriving a polynomial to represent the experimentally determined trajectory. The approximation is shown as a dashed line in FIG. 13. The target trajectory is represented by cost emphasis linear phase with zero slope (and an exception value of −30000 seconds in this example), followed by one with a slope like the idealized curve. The maximum number of temperature steps representing the cost emphasis phase is a dependent upon the classification of the scheduling problem.

It is important to emphasize cost during the initial steps of the search phase because it is rather easy to reduce resource exception by large amounts during the first steps of the search which may result in a resolvable solution which does not minimize global costs. This reduction in resource value is seen in FIG. 12 as a steep linear slope for the first few hundred steps followed by a knee in the curve and then a shallower linear slope to the end of the search. The emphasis on cost early in the search generally serves two purposes. First, if the scheduler reduces resource exception too quickly, it will pack the trains too closely and not be able to meet the 1% target. Second, the resulting global cost of the schedule would be much larger. Therefore, the cost reactive scheduler emphasizes cost early on in the search. The time spent emphasizing cost depends upon the classification of the scheduling problem as discussed more fully below.

A similar plot for cost versus temperature steps (not shown) would show that cost increases as the resource exception decreases. It is the nature of this directed conflict between cost and resource exception that alternatively permits uphill moves resulting in a worse solution in either resource exception or cost but which enables the scheduler to arrive at a more globally optimized solution in both resource exception and cost.

It has been determined, over many months of testing, that a coarse schedule from the cost reactive scheduler which results in a resource exception time which is approximately 1% of the total trip time, will result in a resolvable schedule by the movement planner. Accordingly, the goal of the cost reactive scheduler is to generate a schedule within this target range—thus insuring a low cost solution.

In operation, the cost reactive scheduler may receive a set of orders for train resources (the movement of trains or utilization of other resources) which define a scheduling problem. Each order will have a cost function, typically a polynomial equation associated with it. The order may also have a scheduling window associated with it i.e., earliest departure time and latest arrival time.

Initially, the cost reactive scheduler will classify the scheduling problem as a function of the slack associated with the orders. Slack is the accumulation for all of the orders of the differences for each trip between maximum trip time based on the scheduling window and the minimum trip time based on maximum throttle. The scheduler may compare the slack associated with the scheduling problem with the total trip time for the scheduling problem, and classify the scheduling problem as Cost Constrained, Cost Constrained and Resource Unconstrained, Resource Constrained or Normal as previously discussed.

For example, if the problem slack time is greater than a predetermined parameter, which may be defined in the COPES database, then the scheduler should be able to achieve the target 1% resource exception and the problem may be classified as "Cost Constrained". If the slack time associated with the scheduling problem is greater that 150% of the total unopposed trip time then the problem may be classified as "Cost Constrained And Resource Unconstrained."

If the problem is not Cost Constrained, then another predetermined parameter may be used to determine if a problem is Resource Constrained. For example, if the resource exception time divided by the total trip time is greater than this predetermined parameter, then the resource scheduler may classify the problem as "Resource Constrained".

If it is determined that the scheduling problem does not meet the criteria of the above three classifications, then the scheduler may classify the problem as "Normal".

The scheduler may perform several other functions before initiating the search phase. As explained above, the scheduler will emphasize costs during the beginning of the search phase ("cost emphasis phase"). The duration of the cost emphasis phase may be based on reducing the resource exception to a specified level, or on a maximum number of moves or temperature steps. For example, the scheduler may determine the initial resource exception value and the initial cost associated with the scheduling problem. The scheduler may then determine the level to which the resource exception value must be reduced in order to stop emphasizing costs. The scheduler may also determine a maximum number of temperature steps for emphasizing costs based on the classification of the problem, with the Cost Constrained problem requiring the most temperature steps and Resource Constrained problem requiring the least temperature steps.

Initially, the scheduler may estimate target resource exception as a specified percentage of the total trip time by adding a percent to the total minimum trip time and dividing by 100. Once the search is begun, the target resource exception may be updated periodically, e.g., after every 800 temperature steps.

The initial scaling parameter may be defined by the COPES database. Once the search phase begins, the scaling parameter may be updated periodically. For example, the search phase may comprise a first phase and a second phase. In the first phase, the normalizing component of the scaling parameter may be determined and updated after every move. The normalizing component may be defined as the ratio of the change in resource exception versus the change in cost. The scheduler may also define the normalizing component as a function of the classification of the scheduling problem. For example, if the scheduling problem is Resource Constrained, then the scheduler may retain the largest change ratio as the scaling parameter. For all other classifications, the scheduler may retain the ratio of the average change in resource exception versus the average change in cost as the non-nalizing component. The duration of the first phase of the search may be defined by the COPES database, e.g., the initial 100 temperature steps. After the first phase, the normalizing component is no longer updated and remains constant throughout the second phase of the search.

Throughout both the first and second search phase, the effect of the non-nalizing component is modified and updated after each move by a dynamically changing bias. The biasing component may be used to force the resource exception toward the target trajectory.

The first phase begins the search for a solution to the scheduling problem by making a random move. The resulting resource exception for the problem and the cost associated with the move may be determined by applying the initial scaling factor (for the first move) to the resource exception value and the cost as a function of the classification of the scheduling problem. For example, if the problem is Cost Constrained, the cost will be weighted more heavily than the resource exception.

In each subsequent move, the normalizing component from the previous move is used to determine the scaling parameter for the subsequent move. The biasing component may continue to be determined during the subsequent move as a function of the resource exception as compared to the target resource exception. The normalizing component may be updated during each move as a function of the ratio of the change in resource exception versus the change in cost.

The determination of whether a move is accepted is a function of the classification of the problem, and the change in the resource and cost associated with the move. For example:

a) If the change in resource exception and the change in cost are both improvements over the previous move, then the move is accepted for all classifications;

b) If the change in resource exception and the change in cost are both worse, then reject the move for all classifications;

c) If the if the change in resource exception is worse, but the change in cost is an improvement, accept the move if the magnitude of the change in cost is greater than the magnitude of the change in resource exception; and d) If the change in resource exception is an improvement and the change in cost is worse, accept the move if the magnitude of the change in resource exception is greater than the magnitude of change in the cost, unless 1. the search is not in the Cost Emphasis phase and the resource exception is already better than the target trajectory; or 2. the scheduling problem is Cost Constrained and the resource exception is already better than the target trajectory.

The scheduler may logarithmically reduce the effect of cost change as the search progresses by de-emphasizing uphill resource exception moves as the search temperature decrease, e.g., by including a log 10 factor based on the number of temperature steps.

The second phase of the search is similar to the first phase with the exception that the normalizing component of the scaling factor remains constant. Therefore, the scaling parameter is only adjusted as the biasing component moves the resource exception closer to the target resource exception.

From the foregoing, it will be apparent that the resource scheduler 330 globally optimizes scheduling of the trains by abstracting both train movement and resources. The use of the focused simulated annealing in COPES focuses attention on the critical areas. The generation of move operators, although random, is more directed by allowing the constraints attached to each trip to make decisions regarding the usefulness of modifications to the global solution. The use of a cost reactive scheduler may be used to develop a schedule by evaluating resource exception and the cost associated with the moves to result in a schedule which is not only resolvable, but represents a minimal cost solution.

Movement Planner.

Figure 6:
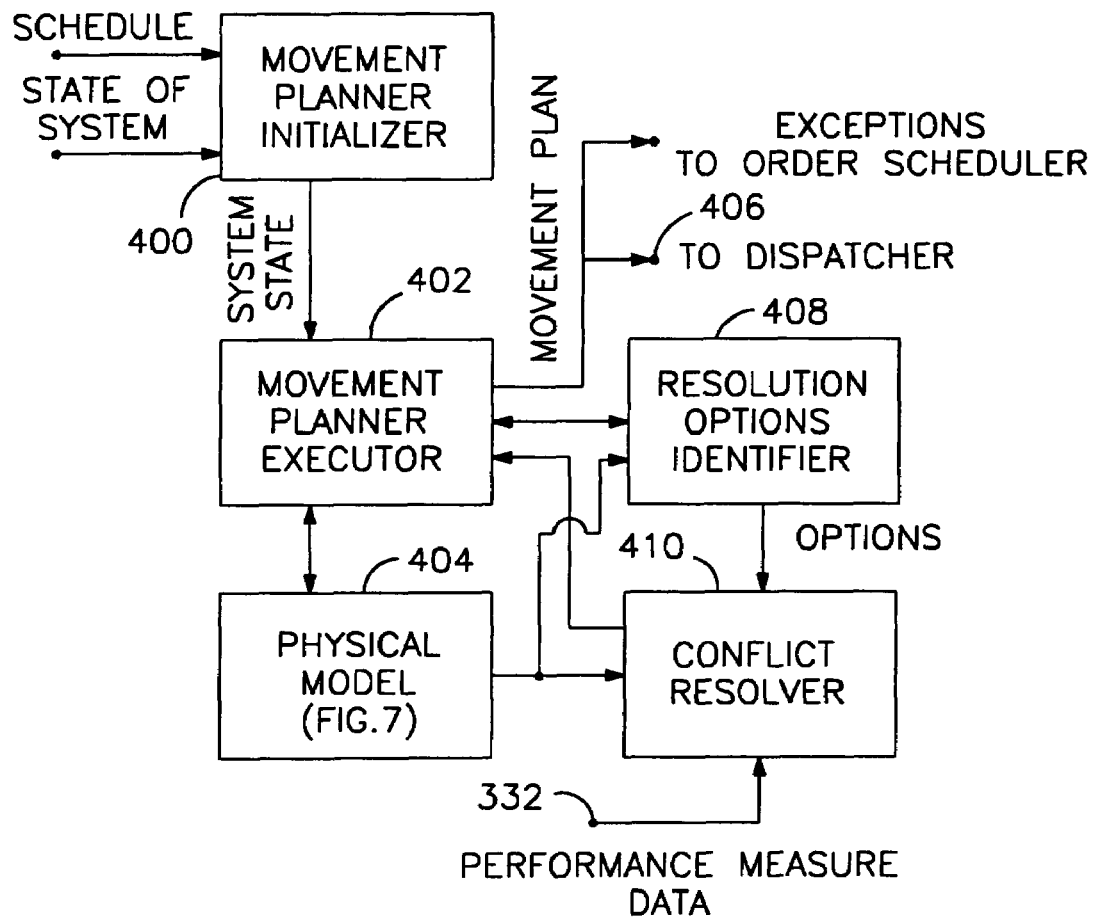
FIG. 6 is a functional block diagram of the movement planner portion of the planner/dispatcher of FIG. 3.

As shown in the system block diagram of FIG. 3, the order scheduler 200 provides the schedule information to the planner/dispatcher 204 a portion of which i.e., the movement planner 202, is illustrated in greater detail in FIG. 6.

Figure 8:
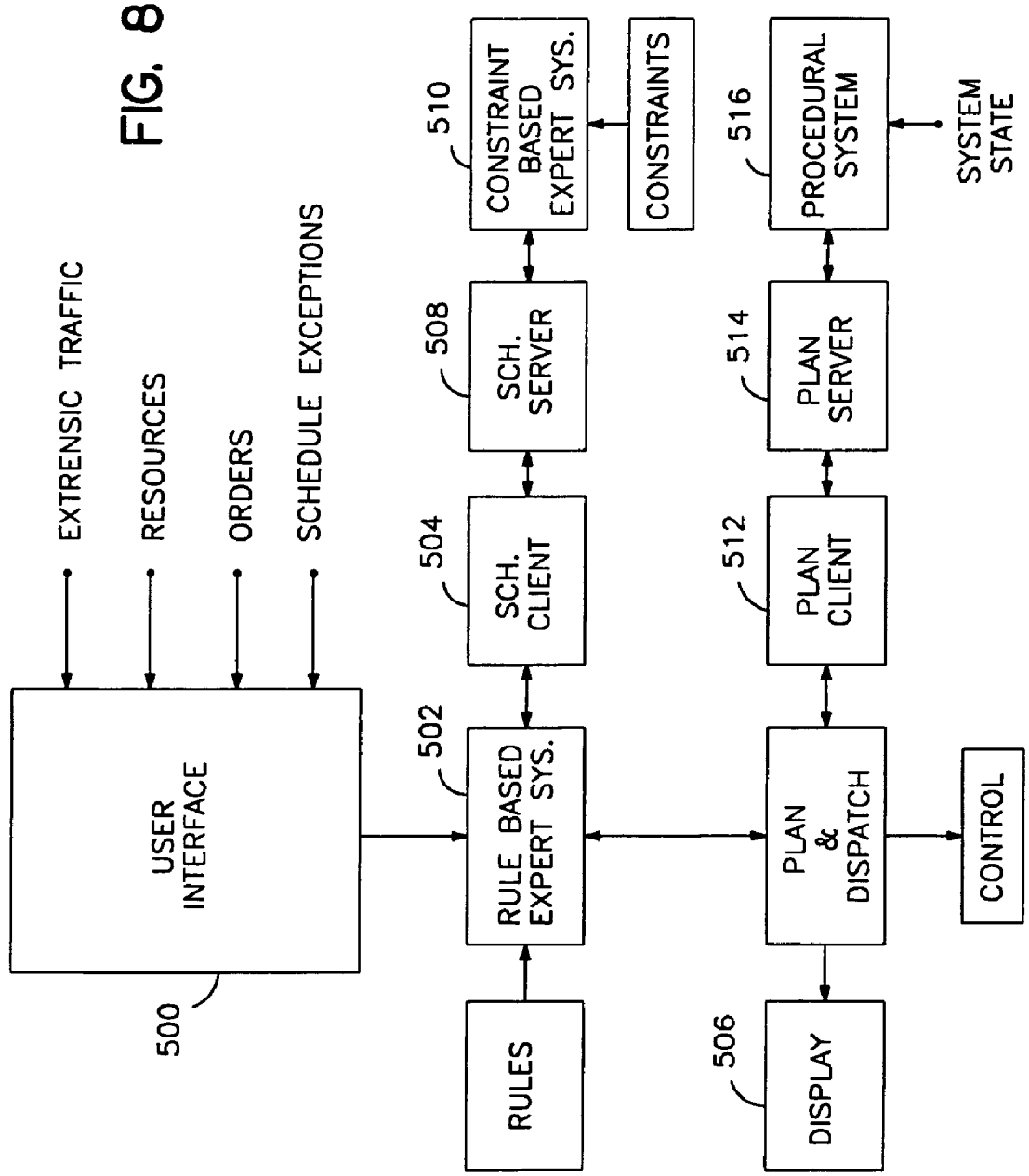
FIG. 8 is a schematic illustration of system operation.

With reference now to FIG. 6, the movement planner comprises a movement planner initializer 400, a movement planner executor 402, a physical model 404 (preferably a stand alone unit as illustrated in FIG. 8), a display, a resolution options identifier 408 and a conflict resolver 410.

The movement planner initializer 400 receives the schedule from the order scheduler 200 of FIG. 3 through the planner/dispatcher 204. The movement planner initializer 400 also receives information regarding the state of the system from any suitable conventional external source, generally from the dispatching function of the planner/dispatcher 204. This information may be developed from a variety of sources such as the geolocating system (illustrated in FIG. 10) or conventional track sensors for determining the location of trains in the system.

The schedule and the data as to the state of the railway system are used along with the definition of each of the trains and their starting point to initialize the movement planner. The definition of a train may include all relevant data such as the number and type of locomotives, the number and type of cars and the weight of each of the cars. The starting point of each train includes its position of the train in the system, its direction on the track, and its velocity. As a minimum for each of the trains, the schedule includes: the originating point, a time of departure from the originating point and a destination point. This data is a "state vector" which is supplied to the movement planner executive 402 along with a time interval which indicates the extent of time that the movement planner 202 should plan train movements.

The movement planner initializer 400 may be any appropriately programmed general purpose or special purpose computer.

The movement planner executor 402 receives the schedule and state of the systems data from the movement planner initializer 400 and is connected for two-way communications with the physical model 404 and the resolution options identifier 408. The movement planner executor 402 also receives information from the conflict resolver 410 and provides information to the planning/dispatching function through a terminal 406.

The movement planner executor may be any appropriately programmed general purpose or special purpose computer.

The movement planner executor 402 receives and records the state vector, and uses the services of the physical model 404 to advance time in increments until (a) the physical model 404 reports a train conflict, (b) a specific stop condition occurs or (c) the simulation time interval is reached.

If a train conflict is reported by the physical model 404, the state vector at the time of the conflict is saved and the conflict is reported by the movement planner executive 402 along, with the data reporting the time history of the motion of the trains. Alternatively or in addition, the existence of and background information relating to the detected conflict is reported by the physical model 404 to the conflict resolver 410.

The physical model 404 follows the motion of the train once it has been provided by the movement planner executive 402 with data identifying the initial state, stopping condition and the time advanced interval.

The resolution options identifier 408 receives the notice of a conflict from the movement planner executor 402 and identifies the options available for the resolution thereof.

The conflict resolver 410 receives the identified options from the resolution options identifier 410 and performs an analysis based on the performance measure data received from terminal 332 of the order' scheduler 200, FIG. 4. This evaluation is accomplished by simulating each of the options and computing the associated performance measure or figure of merit.

If "local optimization" is desired, this "best" result is reported to the movement planner executor 402 for display to the dispatcher and/or the movement plan is revised to include the alternate path, if applicable, and the simulation using the physical model 404 is repeated beginning from the initial state or other recorded state. Local optimization is satisfactory in a large percentage of scenarios if the schedule provided by the order scheduler 200 of FIG. 3 has been sufficiently intelligent in specifying the dispatching times. If the dispatch times are not carefully specified, local optimization may lead to "lockup", i.e., a condition in which conflicts may no longer be resolved. Lockup occurs because the resolution of one conflict leads to or limits the alternatives for resolution of another set of conflicts.

"Global optimization" may be performed using a variety of optimization techniques, preferably a version of the well known "branch and bound" technique for searching a tree of alternative solutions. In the branch and bound technique, each of the conflicts is modeled as a branch point on a decision tree. As the simulation proceeds and conflicts are resolved, the search technique chooses the lowest cost alternative and continues the simulation. The cost of alternatives is saved, as is the state of the system for each of the conflict points. It is possible that choosing the lowest cost solution among the alternatives may not result in the optimum overall solution. The branch and bound technique allows the search to back up in the tree and retract decisions previously made In order to reach a lower cost solution or avoid a lockup.

The movement plan available at the dispatcher terminal 406 desirably includes a suitable conventional display to display the motion of the trains until a conflict occurs, and to present the time history leading LIP to the conflict in a graphical form for interpretation and resolution by a human operator.

In addition, the data from the optional resolution options identifier 408 may be displayed to the operator to assist him in manually resolving the conflict. In addition to the options and the cost associated with each, the conflict resolver 410 may provide a suggestion as to resolution of the conflict and that suggestion may also be displayed to the operator.

The Scheduling Process

The interaction of rule based and constraint based systems in the order scheduler of FIG. 4 and the movement planner of FIG. 6 may be more readily understood by reference to the system as illustrated in FIG. 8.

As is well known, a constraint is a limit on the value of an entity. Constraints considered in this description generally fall into three categories, those time constraints which are inherent in the task of filling an order, those constraints which are inherent in the structure of the railroad, and those constraints which are explicitly specified by the user.

Order constraints include the sequential nature of the activities based upon the fact that a train cannot jump from one point to another without passing through some intermediate segments. For example, in order to load coal at a mine, a train must capture the track segments, in the appropriate order, from the place at which the train originates to the destination mine and only then capture the track segment at the mine and the mine loading equipment.

Constraints are also inherent in the structure of the railroad. Such constraints include gap-able elements (sidings located between segments) and single/multiple track configurations. A wide variety of user defined constraints may be included. These constraints are generally time constraints which seek to restrict the resource scheduler 330 from scheduling certain resources over certain time periods.

One example of such a constraint is a mine which has limited hours (e.g. daylight only) during which it can load coal. Such a constraint would be included by limiting the resource availability to a specified interval. Another example of such a constraint is resources, such as track or locomotives, which are out of service for maintenance during a specified time interval. Still another example is a train which is not under the control of the scheduler, e.g., a passenger train which is scheduled by an entity external to the freight train scheduler. All of these constraints may be included by appropriately defining the resource availability timelines.

The rule-based process converts orders into a form which is suited to a constraint-propagation solution and restricts the search space by eliminating certain candidate solutions, based upon a set of rules incorporating company policy, standard operating procedures and experience factors, among others. The constraint-based process solves the problem of moving time intervals to maximize the externally supplied performance measure while satisfying all of the constraints. The result of this process is a schedule for railway operation which includes a globally optimized schedule for train operation, maintenance activities, and terminal equipment.

As shown in FIG. 8, each of the processes may be implemented as an asynchronous UNIX process with inter-process communications between the two processes implemented using a well known client server relationship based upon UNIX sockets.

In the event that the procedural means is provided, it also is implemented as one or more asynchronous UNIX processes. These processes communicate using a well-known client-server inter-process communications. The procedural means is used to refine the schedule to include details of the rail system. This is accomplished by simulating the operation of the railroad, identifying the conflicts in the schedule which result from the level of model abstraction used in the constraint-based process, and adjusting the schedule to eliminate those conflicts while at the same time maximizing the performance measure.

Once this is achieved, the movement plan obtained by refining the schedule is returned to the rule-based processor. If for any reason, all conflicts cannot be resolved, the movement plan is returned to the rule-based processor with the conflict duly noted. The rule-based processor examines the movement plan based upon set of rules depicting company pollicies and, if the movement plan is satisfactory, forwards the movement plan to the dispatcher for display or for use in controlling the applicable trains as described infra.

Operation of the system of the present invention may be seen with continued reference to FIG. 8, in which orders, the identification of extrinsic traffic, schedule exceptions, and an identification the resources available as a function of time 110 accomplish the order are received by a user interface 500. A schedule exception is a predicted failure to meet a defined schedule which requires rescheduling of the involved resource and possibly other affected resources. Extrinsic traffic is pre-scheduled traffic not to be altered by the system. Orders may arrive as a batch or arrive in a sequence over a period of time.

The user interface 500 translates this data into "facts" and asserts them into the rule-based process. The user may also add, remove, or change certain rules in the rules database for the purpose of including company policy and other experience factors which may change over time.

The user interface 500 provides data to a rule based expert system 502. A variety of expert system tools are available to allow the facts to be asserted and processed by a rule-based inference engine according to the rules contained in the rule data base. The preferred implementation is the C-Language Integrated Production System (CLIPS) developed by NASA Johnson Space Flight Center because it is readily imbedded into a system and supports an object-oriented approach which is compatible with the constraint-based element.

The functions of this expert system are determined by a set of rules which may be divided into several categories. Order specific rules include rules which identify the sequence of activities with associated resources which are required to fill an order and put the order into a structure which can be interpreted by the constraint based interference engine.

Order specific rules also include rules which determine the extent to which scheduling will be performed in the event that a prior schedule exists. For example, company policy may dictate that trips scheduled to begin within a specified time period not be rescheduled upon receipt of a new order, but may be rescheduled in the event of unforeseen delays which impact the existing schedule. These rules may be modified as new types of service, company policy, standard operating procedures, or experience factors on the handling of orders are changed.

A second category is rules which receive availability information from the user interface 500 and process these rules into a form which is suitable for application to the constraint based process. Availability is modified to account for extrinsic traffic, locomotives out of service for repair or maintenance, track out of service, or other factors which affect the availability profiles.

A third category of rules are rules which restrict the search space for the constraint based process. Rules are provided to determine the route to be taken to accomplish the order. In many of the larger railroads there are multiple paths which can be taken to move a train from one point to another. This set of rules selects the optimum path based upon principals of physics, specified performance measures, standard operating procedures or and experience factors. Trains which cannot service an order because of locomotive power or terminal equipment limitations are excluded from consideration.

A fourth category of rules is those rules which evaluate the schedule returned by the constraint based process and either resubmit the orders to the constraint based process after relaxing some of the constraints, submit the schedule to the procedural means (if available), or notify the user through the user interface 500 that the request is overly constrained and cannot be scheduled. If the procedural process is provided, a fifth category of rules are those rules which evaluate the schedule and determine if it should be replanned, i.e. if there are no conflicts present, is it acceptable according to company policy and is it complete.

If implementation of the movement plan on the actual trains is contemplated, then a sixth category of rules are those which receive notification of deviations of the trains from the movement plan and determine whether or not re-scheduling should occur, and if the rescheduling should be performed by adjusting the movement plan or the schedule.

A request to schedule an order from a scheduler client 504 may be submitted via the client-server 508 to the constraint based expert system 510 for scheduling. Upon receipt of a schedule from the scheduler client 504 which contains unresolved conflicts, the rule based expert system 502 determines the action to be taken. Depending upon the rules, this action may include rescheduling or, if the unresolved conflict is small, the schedule may be forwarded to the procedural means (if available) to resolve in the course of refining the schedule into the detailed movement plan.

The schedule may be passed to a dispatcher terminal/display 506 if desired for display to an operator (e.g. a dispatcher) or to automated dispatching. If the procedural process 516 is available, the schedule along with a performance measure may be passed there via the movement planner client 508 for refinement.

The scheduler client 504 may receive a schedule request from the rule-based expert system 502, translate it into a structure understood by the scheduler server 508 and submit it to the scheduler server 508. This schedule request may includes one or more orders. As earlier described, an order may contain information such as the total quantity of commodity (if the order is for bulk delivery), the earliest time that pickup can occur, the latest time for delivery, and a performance measure reflecting penalties for late delivery and/or incentives for early delivery. In addition, the order may reflect the activities required to service the order and the resource types (e.g., trains) suitable for servicing the order.

Further, an order may include a percent of full speed parameter and a slack time percent parameter. The percent of full speed parameter indicates that the schedule should be built with the trains running at less than maximum speed, thus giving the movement planner more latitude in satisfying the resulting schedule. The slack time percent provides a limited amount of cushion within which the movement planner can move the train trips to assure meeting the overall schedule.

In the reverse direction, the schedule client 504 receives the schedule from the constraint based system 510 via the scheduler server 508, and translate it into a fact which can be asserted in the rule-based expert system 502.

The schedule server 508 receives an order in the form described above and translate it into a form compatible with the constraint based expert system 510. It also translates the schedule produced by the constraint based expert system 510 into a form compatible with the scheduler client 504. The scheduler server 508 and the scheduler client 504 communicate using client-server inter-process communications well known in the art.

The constraint propagation expert system 510 satisfies a set of constraints describing an order asserted by the scheduler server 508. All of these constraints may be included by appropriately defining the resource availability timelines.

Constraints specified by the user include resources, such as track or locomotives, which are out of service for maintenance and train not under the purview of the scheduler, such as an Amtrak train which is scheduled by an external entity.

The preferred implementation for the constraint based system 510 is the well known search technique known as simulated annealing. However, other search techniques such as genetic search may be suitable for some applications.

Simulated annealing may be implemented using a constraint propagation shell based upon the Waltz algorithm (described, e.g., in "Understanding Line Drawings of Scenes with Shadows," The Psychology of Computer Vision, ed. P. Winston, McGraw-Hill, New York, 1975).

The capability to translate the sequence of activities in the activity list to a sequence of time intervals may be provided by a commercially available train performance calculator.

Alternatively, a custom developed process based upon the Davis Equations for train motion or suitable conventional means may be used to of estimate the time required for a resource to complete a specified activity. If alternative resources are available for accomplishing an activity, then alternative intervals are defined for each activity. A list of interval s, grouped by resource and by time may thus be produced.

Intervals are grouped together in a logical way, typically initially on the basis of entire train trips (if applicable to a particular order).

Planning is performed initially with the groups and then is divided into gap-able intervals for continuing the search process. A gap-able interval is an interval in a group after which a gap is allowed before the next interval in the group. This representation is used to represent the presence of a siding or other capability for holding a train for an interval of time while another train passes. Capability is provided to receive the interval groups, resources available intervals, and performance measures and conduct a search for a schedule which (a) satisfies the resource availability constraints, (b) satisfies the interval constraints, and (c) minimizes the performance measures.

When the search algorithm has completed its search without finding a solution, the interval groups are further subdivided or gapped, the intervals regrouped and then the identification of the resources and activities involved in the conflict.

A display 506 is desirably provided to display the resulting movement plan for user examination. A variety of means may be used to display the plan. A popular approach is a standard stringline diagram used by railroads. As illustrated in FIG. 2, the stringline is a line drawing in which the position on the track is plotted as a function of the time for each train.

A movement planner client 512 is provided to translate the schedule into the form of a request for planning which is compatible with the movement planner server 514. Upon completion of the movement planning by the procedural system 516, the movement plan is received from the movement planner server 514 and translated into a form which is compatible with the rule based expert system 502.

The movement planner server 514 translates the request for movement planning into a form which is compatible with the procedural system 516. The server 514 also translates the movement plan received from the procedural system 516 into a form which can be understood by the movement planner server 514. The movement planner client and movement planner server 514 communicate using, conventional inter-process communications.

The procedural system 516 receives the schedule and a state of the rail network (position of trains) from an external source and initializes a simulation capability with the definition of each of the trains and their initial point. The definition of a train includes the number and type of locomotives, the number and type of cars and the weight of the cars. The position of each train includes its position of the train, its direction on the track, and its velocity. The motions of all of the scheduled trains is simulated until a train conflict occurs, a specified stop condition occurs, or the simulation time interval is reached.

If a train conflict occurs, the state vector at the time of the conflict is recorded and the options available to resolve the conflict are determined. If no conflict occurs, then the movement plan is complete and it is reported to the movement planner server 514 for forwarding to the rule based system and for execution by the planning/dispatching function.

The options available to resolve a conflict may be enumerated. Conflicts may be classified as "meets", "passes", "merges", or "crossings". The options for resolution of a conflict include moving one of the trains to an alternate track to await the passing of the conflicting train. Alternatively the departure of a train from its origin point or other point at which it is stopped may be delayed until the way is clear.

Still another option is to stop one of the trains at a point along its path to allow the other train to move onto an alternate track. The identification of alternate track options and options for stopping along a route are enumerated beginning with those options which are closest to the point of conflict.

One of the advantages of the present system is evaluation of the options and the selection of the option which results in the best performance measurement. Best performance is determined by a performance measure supplied by the rule based system. Evaluation of each option is accomplished by simulating each of the options and computing the associated performance measure. If "local optimization" is employed, the movement plan is revised to include the best alternative path (if applicable), and the simulation is rolled back to the closest point back from the point at which the trains involved in the conflict transferred to an alternate track. Local optimization is satisfactory in a large percentage of scenarios because the prior scheduling operation performs a global optimization. Global optimization may be performed using a variety of optimization techniques.

It is desirable to use a version of the well known "branch and bound" technique for searching a tree of alternative solutions. In the branch and bound technique, each of the conflicts is modelled as a branch point on a decision tree. As the simulation proceeds and conflicts are resolved, the search technique chooses the lowest cost alternative and continues the simulation. The cost of alternatives may be recorded, and the state of the system may be recorded periodically. It is possible that choosing the lowest cost solution among the alternatives may not result in the optimum overall solution. The branch and bound technique allows the search to back up in the tree and retract decisions previously made in order to reach a lower cost solution.

The Physical Model.

An important aspect of the present invention is the use of a physical model of the topology of the railway system in several levels of abstraction in the planning process. The topology of a railway system may be represented with multiple levels of complexity.

This provides not only the capability to model highly complex systems, but also to hide levels of complexity where such complexity is a detriment to the efficient utilization of the model.

Preferably, and as shown in FIG. 9, an object-oriented rail topology model is composed of three fundamental elements, i.e., nodes, segments, and connectors. A segment is used to represent a length of rail which may be single or multiple track and is composed of an ordered collection of fragments. A fragment is a piece of track which has constant grade, constant curvature, constant speed limit, and length.

A node may represent a complex object and may itself contain internal structure composed of nodes, segments and connectors. Connectors are used at each end of a segment to join a segment to a node, and nodes may possess an arbitrary number of connectors. Each element of the topology is provided with a unique system identifier to enable the identification of a location by reference to the system identifier.

At the highest level, a rail network is represented as a node. This rail network node contains structure which in turn can be represented as a set of nodes connected by segments. This first level of complexity models a rail network as a set of track segments connecting nodes which represent gross entities such as ports, mines, setout yards, sidings, crossovers, forks, joins, and branch points. For simple track structures such as switches and junctions, this level of detail may represent the maximum level of detail. For more complex track structures such as setout yards, further levels of complexity may be added until the entire rail network is modelled in detail.

Figure 9A:
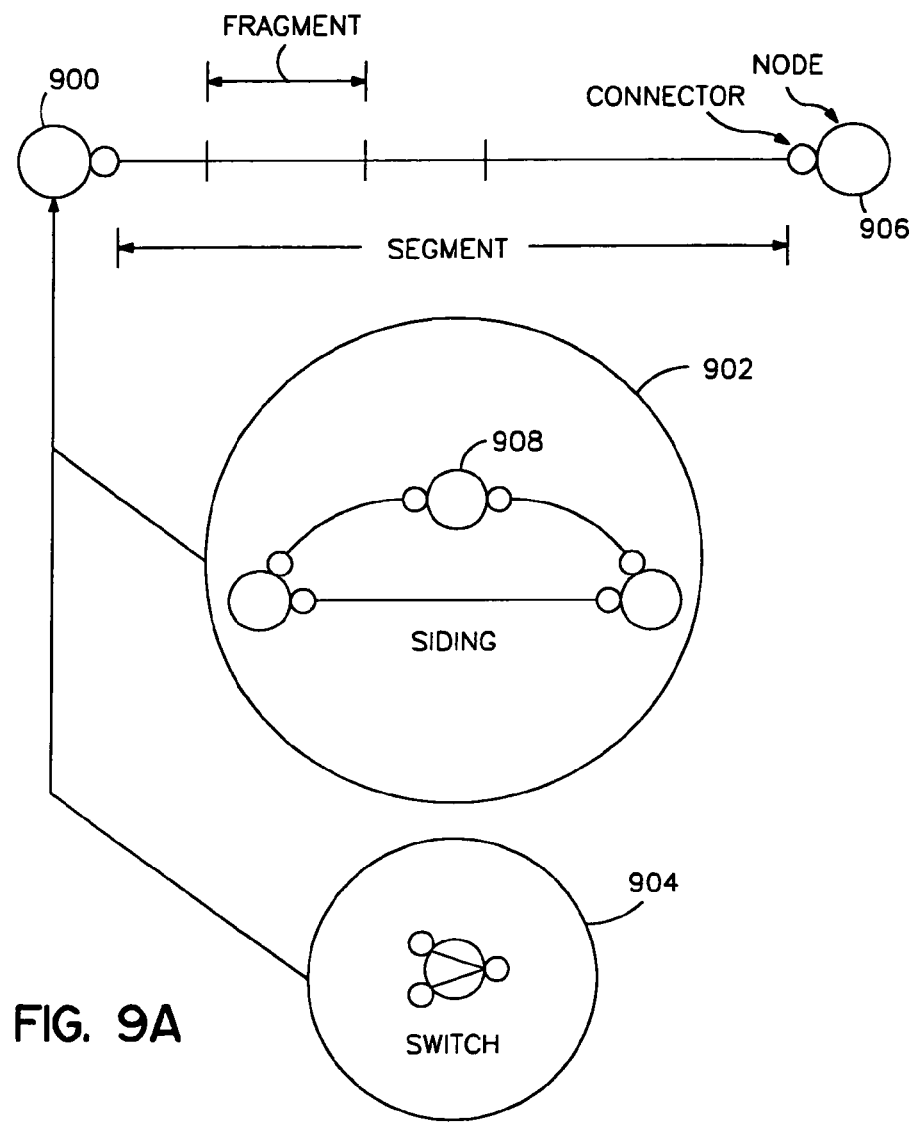
FIG. 9 is a pictorial illustration of the multilevel abstraction of the three dimensional model of FIG. 6.

As illustrated in FIG. 9A, the node 900 at one end of a segment may be a siding 902 or a switch 904. The node 906 may represent an entire port, with multiple nodes.

Figure 9B:
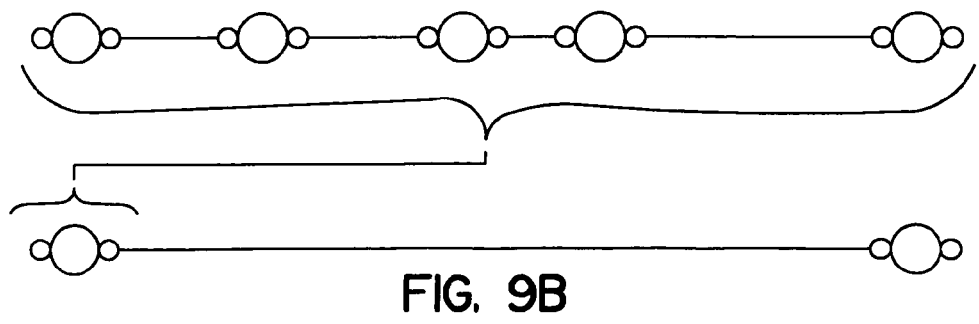

As shown in FIG. 9B, the use of one or more nodes within a node is particularly useful in developing different degrees of abstraction in something as simple as sections of track.

The position of a train in a rail network is indicated by the position of the head of the train. The head of the train is located by the segment identifier and an offset from the connector on the segment. In addition, the direction of the train and the length of the train may be used to locate the remainder of the train.

Figure 7:
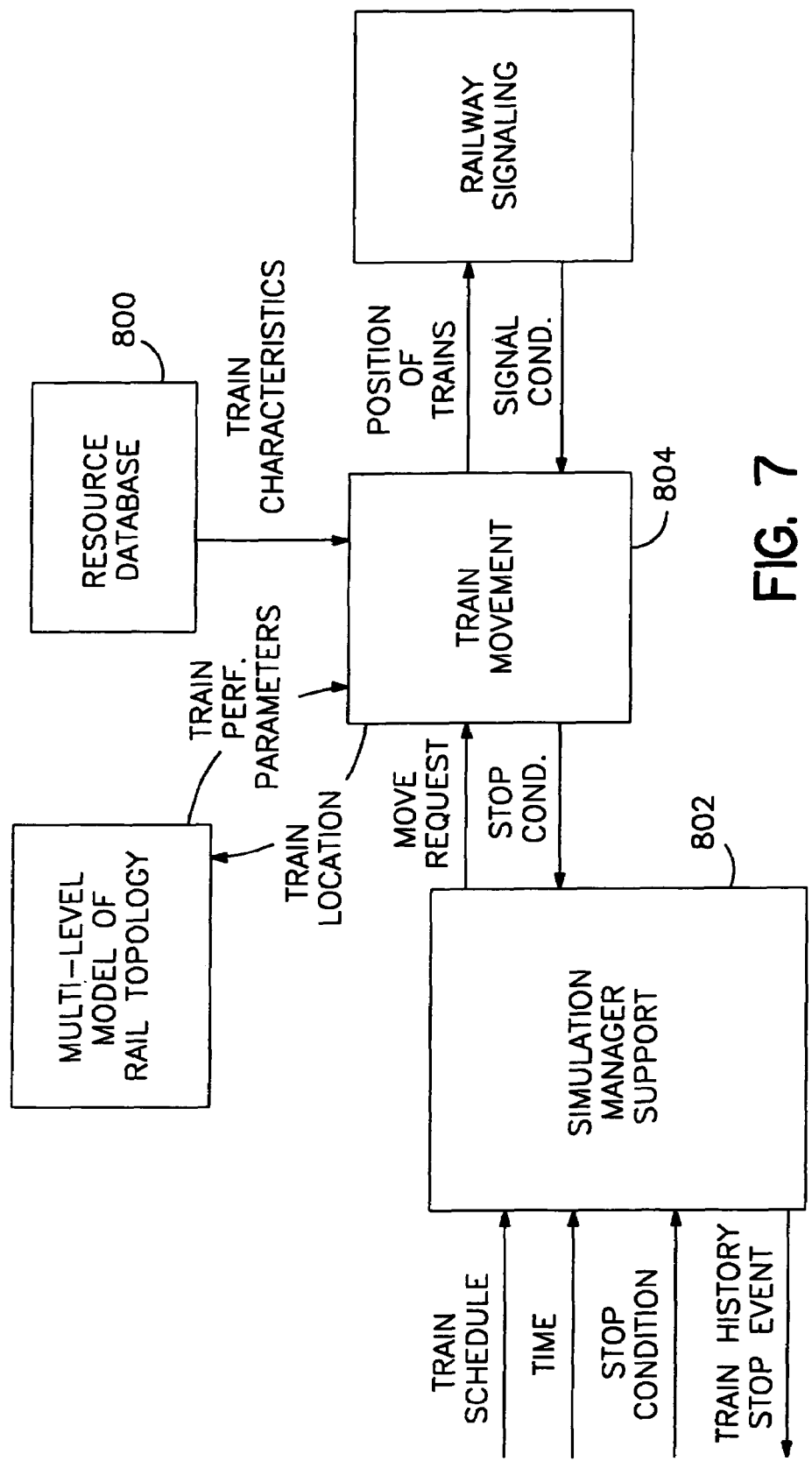
FIG. 7 is a functional block diagram of the physical model of FIG. 6.

With reference now to FIG. 7, data as to the position, direction and length of a train may be used to calculate the resistance of the train, by taking into account the grade and curvature of the track fragments upon which the train is located, the train velocity and other train parameters.

Routing from one point to another in the system may be computed by using any network routing algorithm. The well known Shortest Path First (SPF) algorithm is frequently used. However, the algorithm need not use distance as the performance measure in computing path length and more complex performance measures involving grades, for example, are often useful.

The characteristics of the railroad rolling stock may be stored on a conventional resource database 800. This includes the physical and performance data on each locomotive, its type, weight, length, cross sectional area, horsepower, number of axles, and streamline coefficients (both as lead and as following locomotive). For each car, the type, tare weight, length, cross sectional area, loaded weight, number of axles, and streamline coefficient may be provided. Unit trains are also defined in the database with an identifier, train speed limit, list of locomotive types and list of car types. This resource database may be implemented in tabular form, complex data structure, or using any commercially available database.

The defined train objects may be propagated through the system in accordance with requests for train movement provided by the simulation manager support 802. All train movement is in accordance with the equations of physics, basic train handling principles, and well known train control rules. The route of each train, provided by the simulation manager support, may consist of an ordered list of fragments from the source to the destination of each train trip with train direction on each fragment also indicated.

The movement of the trains along the track is governed by simple physics equations to compute the acceleration of the train. The initial acceleration of the train is bounded by the adhesion of the rails and the weight of the locomotive. In addition the acceleration of some high horsepower locomotives may be limited by the force that would cause the train to uncouple.

It is desirable that the train handling rules allow the train to accelerate with maximum acceleration subject to the available tractive force of the locomotives, maximum tractive force at the rails, and the decoupling force. These values are typically set somewhat lower than actual to allow for conservative handling of the train by an engineer. Once the scheduled speed, or speed limit (if is lower) is attained, the tractive force of the train is set exactly equal to the resistance of the train in order to maintain the speed.

Train braking is applied to stop the train, to reduce speed to a lower speed limit, to avoid interfering with another train or in response to a signal, and to maintain a safe speed on a grade. Many techniques are available to model train braking. The capability to anticipate braking needs is provided by searching the track ahead for speed limit changes, other trains or signals.

Three means are provided for controlling a train in order to move plural trains in the network without conflict. These control methods are "no control", "moving block control", and "fixed block control". The no control method is used to move a single train through the network. The train moves through the network with no concern for the signaling system or the presence of other trains. This method is useful when computing data on the unopposed run time for a specific train over a segment of track for use in producing the schedule.

In the fixed block control method, a train checks the railway signalling model at each time interval to determine if a signal is visible to the train and if so, whether the signal indicates that the train should continue, slow or stop. Specific rules in the signalling system depend upon the railroad which is being modelled. The control behavior indicated by the railway signalling model supersedes all other speed limits.

Moving block control is based on establishing a forbidden zone associated with each train. The forbidden zone for a train includes the train and a length of track in front of and along the route of the train which is equal in length to the stopping distance of the train plus any ambiguity as to the train's position. The stopping distance is of course dependent upon the speed of the train, the grade, the track adhesion coefficient, and the weight of the train. This requires that each train monitor the position of the forbidden zone of other trains to assure that the forbidden zone of no other train enter its forbidden zone. To avoid such an incident, brake handling rules are applied to assure that the train decelerates in an appropriate fashion to avoid conflict.

As the trains are advanced incrementally in time, the positions of the trains relative to the specified stop conditions are monitored. If a stop condition occurs, the time advance ceases and the results including a time history of the path of the trains is reported.

In the event that conflicts occur between trains (such as the contact of two forbidden zones, the time advance ceases and the results, along with the type conflict, trains involved, and location are returned to the simulation manager support 802 to support the resolution of conflicts by an external process.

A signalling system based upon conventional fixed block signals may be modeled. Signal blocks are defined and related to the fragment track structures used in the multi-level modelling of rail topology. As the head of a train occupies a fragment associated with a signalling block, the status of the block changes from "unoccupied" to "occupied". When the tail of a train exits all fragments within a block, the block status is changed to "unoccupied". The relationship of the block status to the signals is defined by a set of company-specific railway rules which are part of a standardized set. Information on these rules may be obtained from publications of the American Association of Railroads and other sources. The automatic block signalling (ABS) is well known and may be used as an illustrative implementation.

There are two classes of responses which occur when a train enters or exits a signal block, i.e., control of following trains and control of opposing trains. In the case of following trains, and assuming a typical four level signalling system, the signal at the point of entry of the block becomes a "stop" for trains following the subject train. Rule 292 applies which requires a stop for a following train. This signal condition continues until the tall of the subject train has exited the block. At this time the signal is set to "restricted speed", corresponding to Rule 285 which requires a following train to proceed at a restricted speed and prepare to stop at the next block. As the subject train exits the next block in advance, the signal is changed to yellow over green, corresponding to Rule 282 which requires a train to approach the next signal at restricted speed. When the train finally exits the third block in front of the signal, the signal changes to "clear", and corresponding to Rule 281 which allows the train to proceed in accordance with all applicable speed limits.

In many systems the four level signaling system is implemented by two vertically spaced lights, i.e., red over red is stop, yellow over red is restricted speed, yellow over green is medium speed, and green over green is clear.

The signals may also be set for opposing trains. These signals must be set in accordance with the track topology to assure that opposing trains do not enter a track segment with no alternate track when an opposing train is in the same track block. The extent to which a train entering, a block causes opposing signals to be set is defined in the signaling system for each signal block.

The condition of the signals may be passed to the train movement means upon request and is updated each simulation interval based upon the position of the trains as reported by the train movement.

A simulation support manager is provided to initialize the resource database, the multi-level modelling of rail topology, the railway signalling model, and the train movement in response to an external request to perform a simulation. The request to perform a simulation includes the simulation time, the schedule, route, time, increment, trains and their locations, and a list of scheduled actions. An externally supplied schedule contains a route for each train and a schedule for each train. The schedule specifies the list of fragments over which the train will pass and the time that a train departs from a stopped point on the route.

Scheduled actions include "move train to fragment x and stop". A capability is thus provided to move the trains forward, by issuing a command to the train movement section 804 of FIG. 8, until the next event and to report back to the requesting external processor. The next event may be a scheduled event, or it may be an unscheduled event such as a train conflict. Upon completion, whether caused by reaching a scheduled event or caused by an unscheduled event, the history of the simulation and the stop condition or conflict situation encountered is returned to the external process which requested the simulation.

Train Control.

Figure 10:
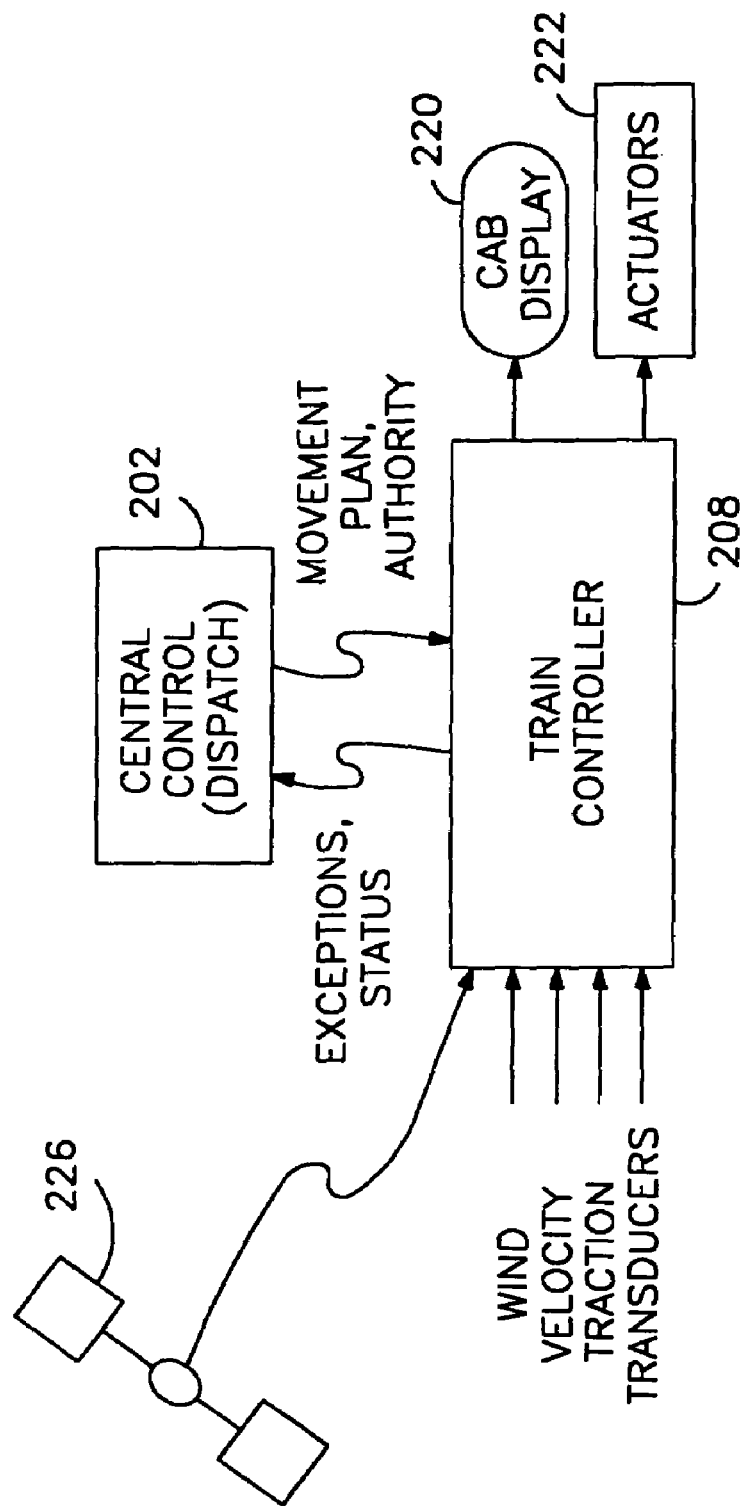
FIG. 10 is a functional block diagram of the train controller of FIG. 3 as may be utilized in a locomotive.

With reference to FIG. 10, at least of the locomotives driving each of the trains in the system of the present invention is configured to have a train controller 208. The train controller 208 receives as much of the movement plan as is applicable to it. As explained further below, the train controller 208 desirably contains a train pacing system which utilizes the track data model, the train handling constraints and actual train position and velocity data, wind data and track condition data to compute a set of train commands which, if implemented, will cause the train to operate on the trajectory provided in the movement plan. The commands determined by the train pacing system may be displayed on a display 220 in the cab of the locomotive for execution by the driver or, alternatively, would be suitable for direct semi-automatic control of the train through convention activations 222, i.e., the commands could directly control power settings and braking (with an driver override, if desired).

To evaluate its progress against the trajectory of the movement plan, the train controller 208 may be equipped with a satellite based position determiner, such as the Global Positioning System ("GPS") 226 and may receive signals from a portion of the track transducer system discussed above. Use of the satellite based position determining system would eliminate the need for most of the transducers, except those at control points, providing considerable reduction of the costs of railway maintenance.

In the system of the present invention, transducers are needed only at the control points, such as switches, in order to have positive confirmation as to which track of many nearby parallel tracks, a particular train is on (or that a train has fully entered a siding). The transducers are used for these functions because they can be uniquely identified with a particular position on a particular track because the typical earth satellite position determining system is accurate to only around 35 feet. Since two parallel tracks could exist within that range, the trains occupancy of a specific track cannot be discriminated by the GPS. By using this combination of transducers only at control points and a earth satellite position determining system, the error of position determining is capped at the accuracy of the satellite system (around 35 feet) and is not dependent upon the near spacing of transducers.

Any other suitable position determining system may be used in the present invention, but the GPS and transducer system is particularly suitable because of the low cost to install and maintain while providing sufficiently accurate position information.

As unforeseen conditions occur to the train as it moves along the track in accordance with the movement plan, the train controller 208 can automatically determine what new train commands are practical to implement the movement plan safely. For example, if the engines are not producing as much power as expected for their power setting, the controller can increases the power by issuing appropriate train commands for display or implementation as discussed above. In determining all the settings, the train controller 208 takes into account a set of applicable safety rules and constraints, train handling constrains, and track parameters.

In situations in which the unplanned disturbances affect the controller's ability to keep the train on the movement plan trajectory, the train may return an exception notice to the dispatch portion of the movement planning function 202. Many times, the transmission of a message of an anomalous condition by the train controller 208 will be entirely redundant as the dispatching function of the movement planning function 202 monitors the state of the system, particularly against the movement plan, and may be already attempting to replan the movement plan in light of the new information regarding the system state, i.e., the anomaly which has occurred to one or more trains.

Figure 11:
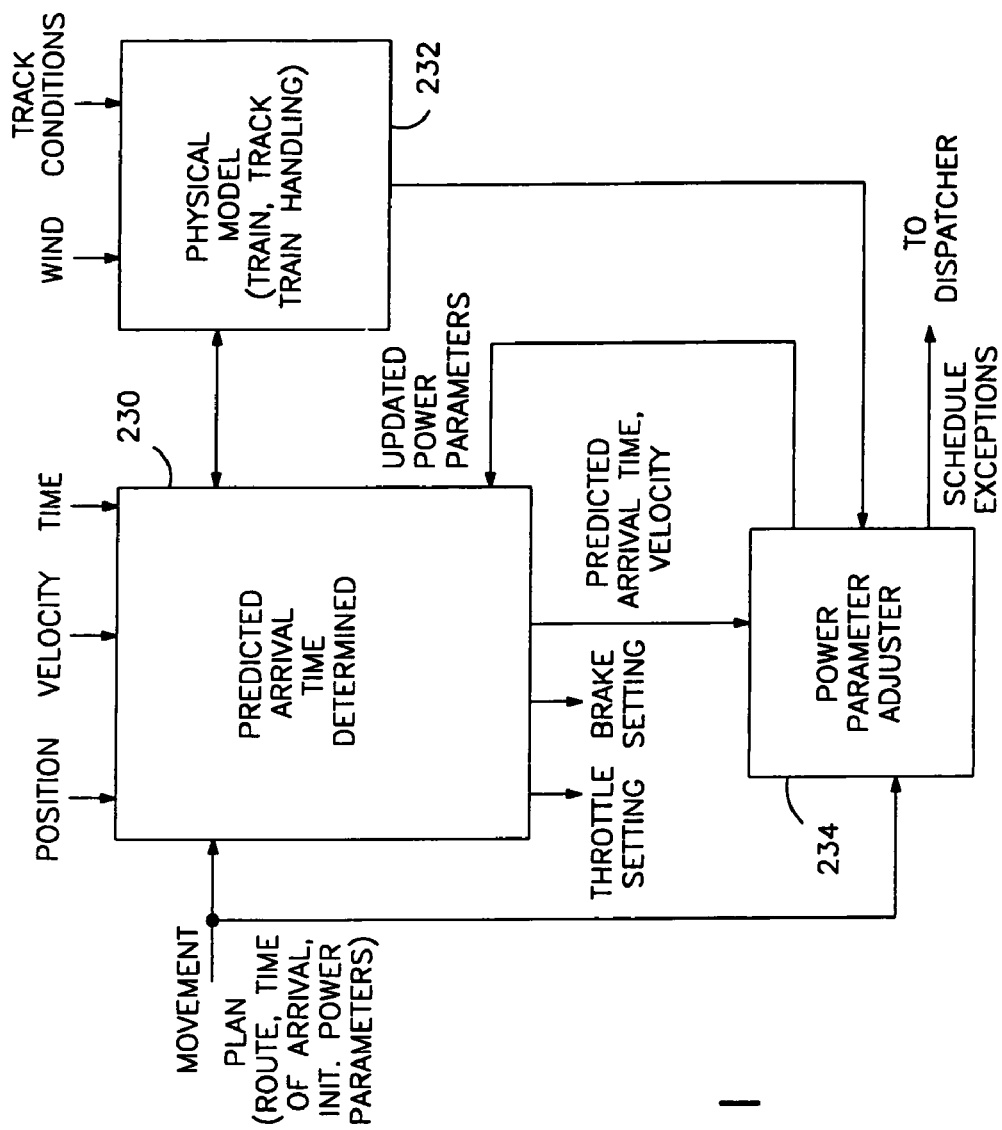
FIG. 11 is a functional block diagram of a portion of the train controller of FIG. 10.

With reference to FIG. 11, the train controller 208 may be understood with reference to the functions which may be carried out to provide the desired control of each train. Specifically, the train controller 208 aboard each train controls the train in accordance with a movement plan which is based upon a high fidelity model of a railroad.

A train movement plan is received from the movement planner, along with an initial power parameter (IPP) which was used in deriving the train's movement plan. An initial power parameter of "1" means that the schedule was prepared using full rated horsepower. In the present invention, the IPP is often made less than 1 in order to allow a train to make up some time if it falls slightly behind the movement plan.

The movement plan may include a route (a list of fragments over which the train will pass) and the time of arrival for each control point along the route and the velocity of the train at that point. In addition, a train's movement plan may contain an identification of the areas in which speed will be restricted due to the anticipated presence of other trains.

As explained further below, a train's movement plan may include data up to the next control point (e.g., a point at which a train must stop for another train). As noted earlier, in addition to the movement plan and the initial power parameter, the controller 208 may receive and/or measure data indicating the prevailing wind and track conditions, the current position, the current time, the current velocity of the train along with the brake pipe pressure.

A predicted arrival time determine 230 may be provided to predict the movement of the train from its present position to the next control point on the train's movement plan. A power parameter is initially set to the initial power parameter. External sources provide the current state of the train (current position of the train on the track and its velocity) and the current time. The route of the train with the power parameter and tile restricted fragments and the current state is forwarded to the Physical Model 232 to perform a simulation of the movement of the train over the track.

The physical model 232 returns the expected arrival time assuming that the train continues with the same power parameter. The physical model 232 also returns a throttle and brake setting for the time interval until the next update time. The throttle and brake setting is forwarded to the engineer's display means along with the expected time of arrival at the next control point. Alternatively, the throttle and brake setting may be used to control actuators which automatically make the throttle adjustment. The predicted arrival time and velocity at the destination is passed to a power parameter adjuster 234.

The physical model 232 models the motion of a train over a detailed model of a track. The physical model 232 has the capability to represent the topology of a railway network with multiple levels of complexity. In one embodiment an object-oriented rail topology model composed of three fundamental elements: nodes, segments, and connectors may be used. As earlier explained, a segment is used to represent a length of rail which may be single or multiple track and is composed of an ordered collection of fragments. A node may represent a complex object and contain internal structure composed of nodes, segments and connectors, and nodes may possess an arbitrary number of connectors. Each element of the topology is provided with a unique system identifier to enable one to denote a location by referencing the system identifier.

At the lowest level of detail, the physical model 232 represents a rail network as a node. This node contains structure which can be represented as a set of nodes connected by segments. This first level of complexity models a rail network as a set of track segments connecting nodes which represent gross entities such as ports, mines, setout yards, sidings, crossovers, forks, joins, and branch points. For simple track structures such as switches and junctions, this level of detail may represent the maximum level of detail needed. For more complex track structures such as setout yards, further levels of complexity may be added until the entire rail network is modelled in detail.

The position of a train is indicated by the position of the head of the train. The head of the train is located by the segment identifier and an offset from the connector on the segment. In addition, the direction of the train and the length of the train may be used to locate the remainder of the train.

The physical model 232 also has the capacity to define a train object and propagate it through the track network in accordance with requests for train movement provided by the predicted arrival time determiner 230 or the power parameter adjuster 234. All train movement is in accordance with the equations of physics, train handling practices, and train control rules.

The train's movement along the track in the physical model 232 is governed by simple physics equations, based upon accepted train dynamic equations such as the Canadian National 1990 Equations, to compute the forces and hence the acceleration of the train. The initial acceleration of the train is bounded by the adhesion of the rails and the weight of the locomotive. In addition the acceleration of some high horsepower locomotives may be limited by the force that would cause the train to uncouple.

In one embodiment of the present invention train handling rules allow the train to accelerate with maximum acceleration subject to the power parameter, available tractive force of the locomotives, maximum tractive force at the rails, and the decoupling force. Once the speed limit of the train or the track segment (whichever is lower) is determined, the tractive force of the train is set exactly equal to the resistance of the train in order to maintain the speed.

All motions of the train are kept in conformity with signals, which are received from external sources and act to slow or stop the train if necessary. For example, restricted speed fragments obtained with the movement plan are used to reduce the train's speed in the areas where it is anticipated that signalling effects will occur. If a moving block control scheme is being used, then external means may provide the position of the immediate train in front and any other train which is scheduled to enter any fragment in the train's route.

The physical model 232 realistically models reduction in speed to a lower speed limit, or in response to a signal, and to maintain a safe speed on a grade. Common commercially available or custom brake handling algorithms may be used to model train braking. Brake pipe pressure may be provided by any suitable external means. The capability to anticipate braking needs is provided by searching the track ahead for speed limit changes, or maybe provided by signals based upon precomputed braking curves. In one embodiment, a capability to determine the appropriate combination of dynamic brakes, independent brakes and air brakes is provided.

As the train advances incrementally in time, the position of the train relative to the specified stop condition (end of the route) is monitored and, the time advance ceases when the stop condition occurs and the results including a time history of the path of the train and its throttle settings are reported to the requesting means.

With continued reference to FIG. 11, the power parameter adjuster 234 adjusts the power parameter to assure that the train arrives at the control point "on-time". The power parameter adjuster 234 may compare the predicted arrival time and velocity with the detected time and velocity and compare the deviation to a user specified allowable deviation from the movement plan. If the difference between the predicted arrival time and the scheduled arrival time exceeds the allowable deviation, the power parameter can be adjusted to correct. To determine the appropriate adjustment, several simulations of the system may be performed. In one embodiment, at least two or three values of the power parameter are submitted sequentially to the physical model 232 along with the route and the current state. Usually, the range of the values for the power parameter includes the value of 1 in order to determine if the train's movement plan is now impossible. If the train cannot meet the schedule with a power parameter of 1, the train reports a schedule exception to the dispatcher and offers a new predicted time of arrival. In the event that a change in the power parameter will satisfy the train's movement plan, a new power parameter is computed by interpolation between the values that were simulated and is supplied to the predicted arrival time determiner 230.

The suggested throttle setting, dynamic brake settings, independent brake settings and air brake settings may be displayed on the cab display 220 or to the driver.

ADVANTAGES AND SCOPE OF INVENTION

As is readily apparent, the system and method of the present invention is advantageous in several aspects.

By the production of a detailed movement plan, tighter scheduling of trains may be accomplished with a corresponding increase in the throughput of the system.

By the use of a model of the physical system and the simulation of the movement of the actual train through the physical system rather than statistical averages, a movement plan may be produced which is realizable by a train. When the statistical average of the time required for movement of a train from node A to node B is used, the projected position of the train assumes instant acceleration and deceleration at all points in the route and a uniform average speed. This is true even though the effects of acceleration and deceleration were considered in deriving the statistical averages. Obviously, such a plan is not realizable by a train and the deviation of the train from such projected locations cannot be used to modify train behavior. However, where the detailed movement plan is actually realizable by the train, any deviation therefrom can be used for control purposes.

Further advantages are obtained by the multilevel abstraction of the physical model to meet the needs of the various components of the system. For example, statistical averages are sufficient in the generating of a course schedule and result in significant savings in computer resources in a search for optimization, but are not sufficient in the optimization in the development of a detailed movement plan.

The combination of rule based and constrain based inference engines is particularly advantageous. A rule based system is effective to narrow the search for an optimum schedule, and provides the constraints for the constraint based system to continue the investigation.

In the constraint system, the use of simulated annealing techniques to perform global searches for optimality provides a computationally efficient means to reliability achieve a course solution. This solution allows the fine grained investigation to be carried out by branch and bound techniques, thereby making optimization possible with the computer resources available.

Further, optimization is more quickly realized by conversion of all resource utilization to time intervals, and the use of search techniques which group these time intervals in groups of varying sizes, with the entire trip first, and then breaking the groups down into increasingly smaller groups only as necessary to obviate conflicts.

It is also a significant advantage for the operator of a railroad to be able to arbitrarily write rules relating to such things as business practices, labor contracts and company policy. For example, a company may have a policy of delaying the departure of a train from a switching yard for ten minutes if a specified number of additional cars call be expected to be available within that time period. Such policy, when written as a rule, becomes a constraint to the movement plan and would thus have been automatically considered in optimizing the movement plan.

Note that the optimization achieved by the present system is global, i.e. it includes both operating costs such as fuel and crews and delivery costs such as premiums and penalties for the time of delivery.

By binding the detailed movement plan to the actual operation of the system, the time at which events occur can be relied upon in operating the system and conflicts in the use of system resources can be reduced to a shortened time period. Note that the effects of the binding of a detailed plan to a detailed operation are two-way the fact that the operation is closely controlled permits the schedule to be finely tuned and vice versa. By having both features, the present invention may significantly reduce the overall throughput on any operational system.

The system of the present invention permits conflicts to be resolved with respect to an overall optimization. Thus, for example, an operational decision regarding the use of an asset, which was done locally in the prior art, is done with reference to minimizing the cost of the overall operation. In terms of the exemplary railway system, for further example, decisions regarding which of two trains should be sided while the other is permitted to pass are made with respect to system level impacts. Thus, the decision in which a train is not sided because it may save ten minutes locally but which ends up delaying downstream trains by many more minutes may be avoided.

Since train handling is included in the physical model, the use of actual breaking curves for the specific train and track rather than statistical worst case scenarios will prevent much of the unnecessary enforcement of safety stops common with the use of existing enforcement devices. The use of simulation of the actual train will also reduce the separation between trains required for safety and thus significantly improve throughput of the system.

While not necessary to the invention, the use of the present invention in railway systems may reduce or eliminate the need for many of the maintenance-costly components in the railway control system. For example, in full implementation of the invention, a railway may eliminate or substantially reduce the costly track signalling and aspect system. Many of the elements of the railway system which are local, including the personnel to operate such local components, may be eliminated or reduced.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof. As is readily apparent, the system and method of the present invention is advantageous in several aspects.

What is claimed is:

1. A method of operating a locomotive having an on-board processor for controlling the operation of the locomotive to move an attached train in compliance with a movement plan over a planned track route to arrive at a planned location at a planned time, the method comprising:

(a) determining a position of the locomotive along the track;

(b) determining a time of the locomotive corresponding to the determined position of the locomotive;

(c) communicating a train movement plan to the locomotive for at least a next segment of track toward the next planned location;

(d) accessing at least one track parameter for the next track segment, the track parameter including at least the topography of the next track segment;

(e) simulating the motion of the locomotive and attached train by advancing the time and position of the locomotive to the next track segment as a function of the track parameter; and (f) using the on-board processor to calculate throttle and brake settings for the locomotive based on the track parameter and simulation to enable the locomotive to move an attached train in accordance with the train movement plan, wherein the on board processor simulates the motion of the locomotive and attached train over a physical detailed model of the track.

2. The method of claim 1 wherein the track parameter is selected from the group comprising track grade, track curvature and conditions of the track.

3. The method of claim 1 further comprising displaying the calculated throttle and brake settings to a locomotive operator for controlling the operation of the train in accordance with the calculated settings.

4. The method of claim 1 further comprising automatically controlling the operation of the locomotive in accordance with the calculated throttle and brake settings.

5. The method of claim 4 further comprising automatically verifying that the calculated throttle and brake settings do not violate safety rules prior to automatically controlling the operation of the locomotive.

6. The method of claim 4 wherein the next segment of track includes track switches and track signals and the step of automatically controlling the locomotive further comprising automatically verifying that the calculated throttle and brake settings control the locomotive in accordance with the track switches and track signals for the next segment of track.

7. The method of claim 4 further comprising automatically verifying that a movement authority has been issued for the next segment of track prior to automatically controlling the operation of the locomotive.

8. The method of claim 4 further comprising calculating the throttle setting based on an expected power produced by the locomotive, determining an actual power produced by the locomotive, and adjusting the throttle setting if the determined power does not substantially match the expected power produced by the locomotive.

9. The method of claim 1 wherein the processor responds to a parameter selected from the group comprising a load carried by the train, locomotive power, train handling constraint, wind, track speed limit, a maintenance of way restriction and current speed of the train.

10. A system for controlling the operation of a locomotive to move an attached train in compliance with a movement plan over a planned track route to arrive at a planned location at a planned time, the method comprising:

a location processor for determining a position of the locomotive along the track;

a communications channel for communicating a train movement plan to the locomotive for at least a next segment of track toward the next planned location;

a database of at least one track parameter for the next track segment, the track parameter including at least the topography of the next track segment; and a train control processor for simulating the motion of the locomotive and attached train by advancing the time and position of the locomotive along the next track segment as a function of the track parameter and calculating throttle and brake settings for the locomotive based on the track parameter and simulation to enable the locomotive to move an attached train in accordance with the train movement plan, wherein the on board processor simulates the motion of the locomotive and attached train over a physical detailed model of the track.

11. The system of claim 10 further comprising a display for displaying the calculated throttle and brake settings to a locomotive operator for controlling the operation of the train in accordance with the calculated settings.

12. The system of claim 10 further comprising a control unit for automatically controlling the operation of the locomotive in accordance with the calculated throttle and brake settings.

13. The system of claim 12 further comprising a safety processor for verifying that the calculated throttle and brake settings do not violate safety rules prior to automatically controlling the operation of the locomotive.

14. The system of claim 12 wherein the next segment of track includes track switches and track signals and the system further comprises a safety processor for verifying that the calculated throttle and brake settings control the locomotive in accordance with the track switches and track signals for the next segment of track.

15. The system of claim 12 further comprising a safety processor for verifying that a movement authority has been issued for the next segment of track prior to automatically controlling the operation of the locomotive.

16. The system of claim 10 wherein the train control processor determines the brake and throttle settings as a function of a parameter selected from the group comprising a load carried by the train, locomotive power, train handling constraint, wind, track speed limit, a maintenance of way restriction and current speed of the train.

17. The system of claim 10 wherein the train control processor determines the brake and throttle settings as a function of the environmental conditions affecting the adhesion of the track for the next track segment.

18. The system of claim 10 wherein the train control processor determines the throttle and brake settings to optimize an objective function.

19. The system of claim 18 wherein the objective function is to reduce fuel usage.

20. The system of claim 18 wherein the objective function is to reduce the cost of operations of the train.

21. The system of claim 10 wherein the train control processor determines the throttle settings as a function of the difference between the expected power produced by the locomotive and the actual power produced by the locomotive.

22. A computer program product for operating a locomotive having an on-board processor for controlling the operation of the locomotive to move an attached train in compliance with a movement plan over a planned track route to arrive at a planned location at a planned time, said computer program comprising:

a computer usable medium having computer readable program codes modules embodied in said medium for controlling the operation of a locomotive and attached train;

a computer readable first program code module for determining a position of the locomotive along the track;

a computer readable second program code module for receiving a train movement plan for at least a next segment of track toward the next planned location;

a computer readable third program code for accessing a database of at least one track parameter for the next track segment, the track parameter including at least the topography of the next track segment; and a computer readable fourth program for calculating throttle and brake settings for the locomotive based on the track parameter and for simulating the motion of the locomotive and attached train by advancing the time and position of the locomotive and attached train to the next track segment as a function of the track parameter, wherein the simulation is performed over a physical detailed model of the track to enable the locomotive to move the attached train in accordance with the train movement plan.

23. The computer program product of claim 22 further comprising a computer readable fifth program module for displaying the calculated throttle and brake settings to a locomotive operator for controlling the operation of the train in accordance with the calculated settings.

24. The computer program product of claim 22 further comprising a computer readable fifth program module for automatically controlling the operation of the locomotive in accordance with the calculated throttle and brake settings.

25. The computer program product of claim 24 further comprising a computer readable sixth program module for verifying that the calculated throttle and brake settings do not violate safety rules prior to automatically controlling the operation of the locomotive.

26. The computer program product of claim 24 further comprising a computer readable sixth program module for verifying that a movement authority has been issued for the next segment of track prior to automatically controlling the operation of the locomotive.

* * * * *